United States Patent [19]
Nakasuji et al.

[11] Patent Number: 5,210,853
[45] Date of Patent: May 11, 1993

[54] ELECTRONIC DEVICE/DICTIONARY WITH IMPROVED INFORMATION STORAGE: MEMORY CAPACITY RATIO

[75] Inventors: Masataka Nakasuji, Yamatokoriyama; Toshiaki Fujiwara; Yoshiro Kihara, both of Nara, all of Japan

[73] Assignee: Sharp Kabushiki Kaisha, Osaka, Japan

[21] Appl. No.: 437,431

[22] Filed: Nov. 15, 1989

[30] Foreign Application Priority Data

| Nov. 18, 1988 | [JP] | Japan | 63-293020 |
| Nov. 18, 1988 | [JP] | Japan | 63-293021 |
| Nov. 18, 1988 | [JP] | Japan | 63-293022 |
| Nov. 30, 1988 | [JP] | Japan | 63-304815 |

[51] Int. Cl.$^5$ .............................. G06F 12/00; G06F 15/20
[52] U.S. Cl. ....................................... 395/425; 364/975; 364/DIG. 2
[58] Field of Search ................... 395/DIG. 1, DIG. 2, 395/800, 275, 1, 400, 425, 600, 65, 700; 364/419

[56] References Cited

U.S. PATENT DOCUMENTS

| 4,117,542 | 9/1978 | Klausner et al. | 364/900 |
| 4,758,977 | 7/1988 | Morimoto et al. | 364/900 |
| 5,007,019 | 4/1991 | Squillante et al. | 395/275 |

FOREIGN PATENT DOCUMENTS 2180973 4/1987 United Kingdom .

OTHER PUBLICATIONS

Dekker et al., *IEEE Micro* (1987) 7(3):22-34.

*Primary Examiner*—Robert B. Harrell
*Attorney, Agent, or Firm*—Morrison & Foerster

[57] ABSTRACT

The information searching apparatus in accordance with the present invention comprises: a memory device having a plurality of banks and containing a plurality of types of information data to be searched, as arranged in block; a table memory device containing, in table, the banks serving as the basis of the information to be searched, the number of changed banks and address data; and a table reading device for reading tabled information from the table memory device. This information searching apparatus is so arranged as to search the target information to be searched by obtaining the base bank information based on the tabled information from the table memory device, and by obtaining the number of changed banks and the address data of the base bank information. Further, this apparatus is arranged such that the user may learn synonyms and antonyms, or the translated terms, the phonetic symbols or the like of index words in dictionary data. Such data may be searched in a short period of time without any complicate operations, thereby to improve the learning efficiency.

26 Claims, 14 Drawing Sheets

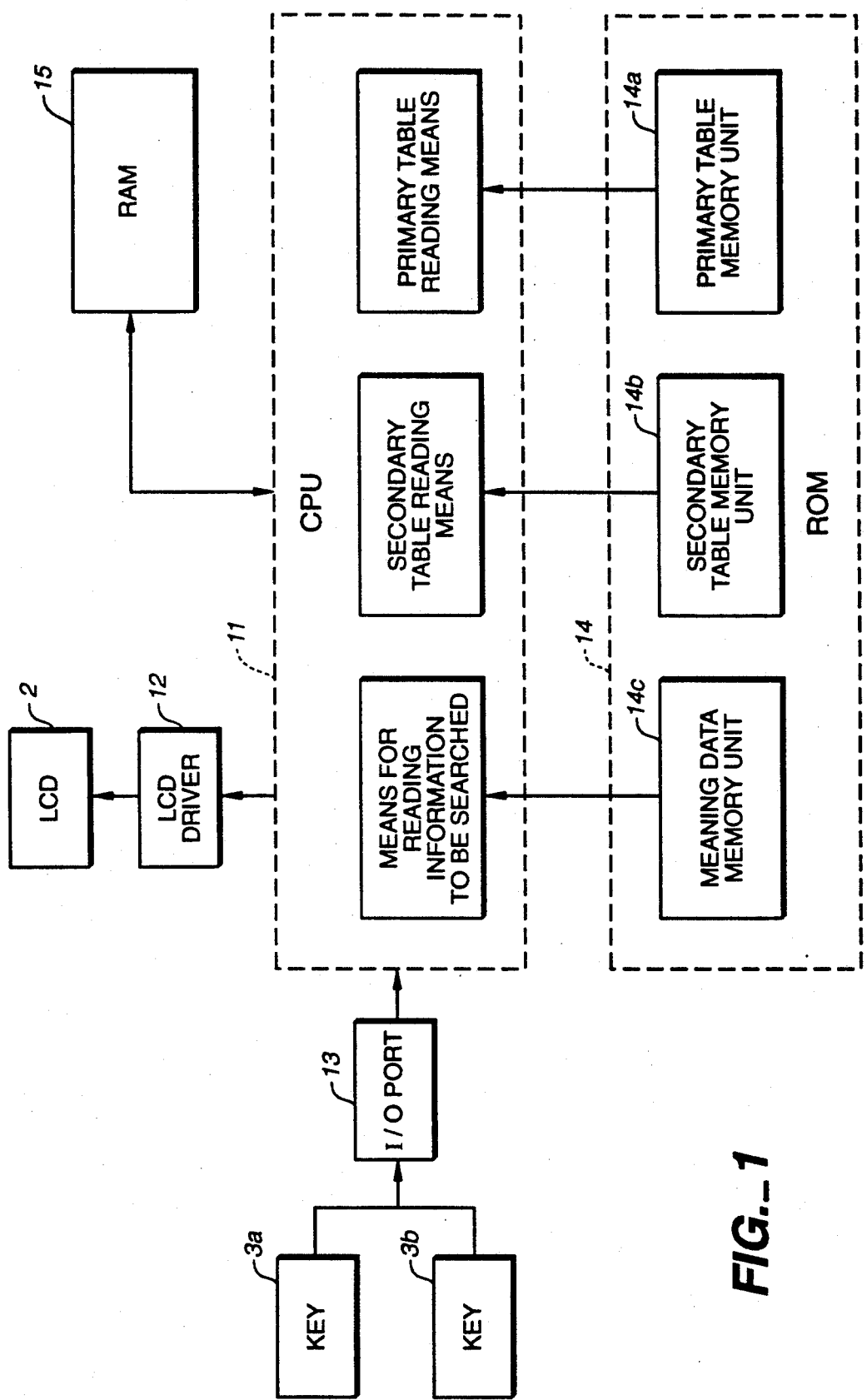
FIG._1

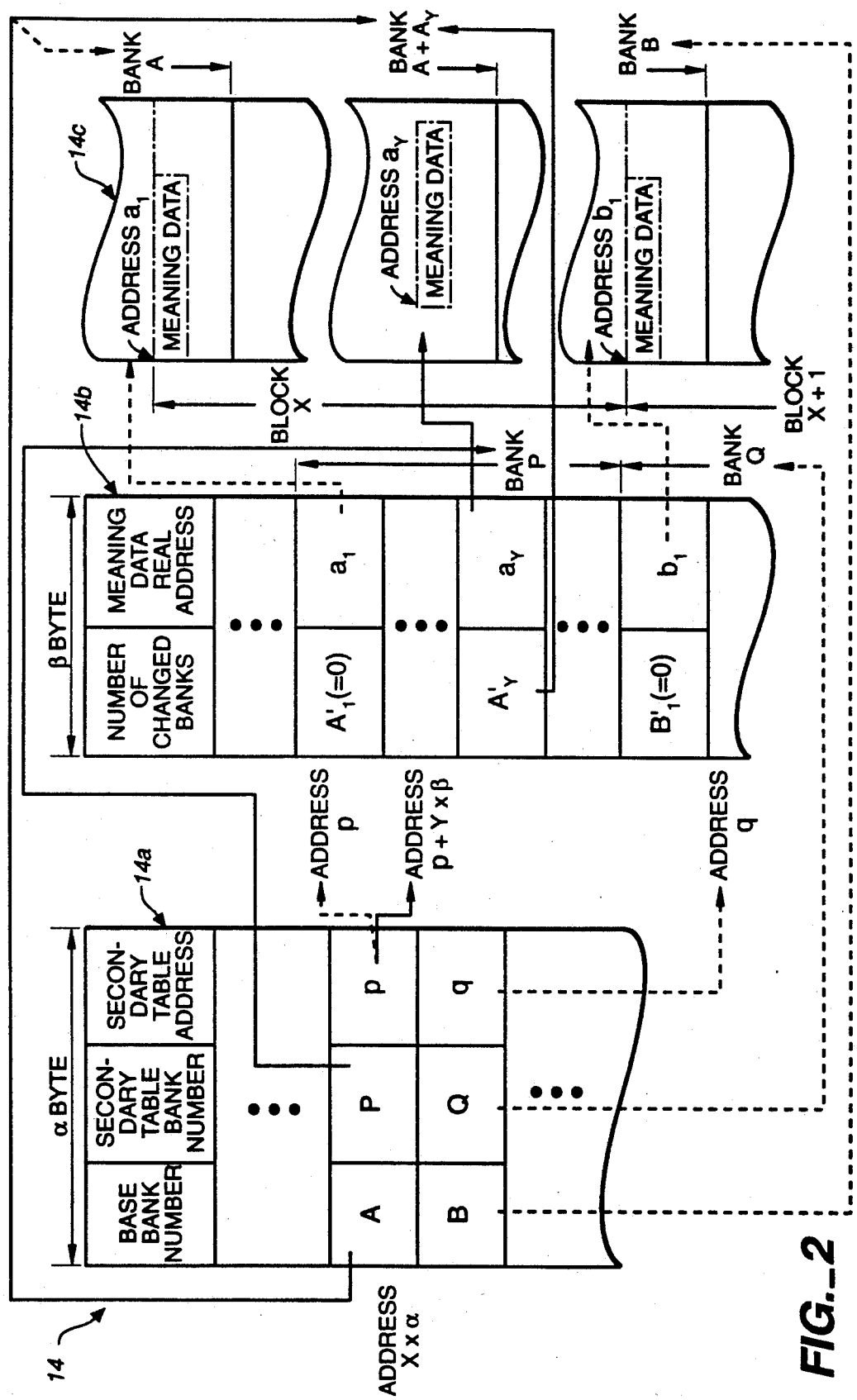
FIG._2

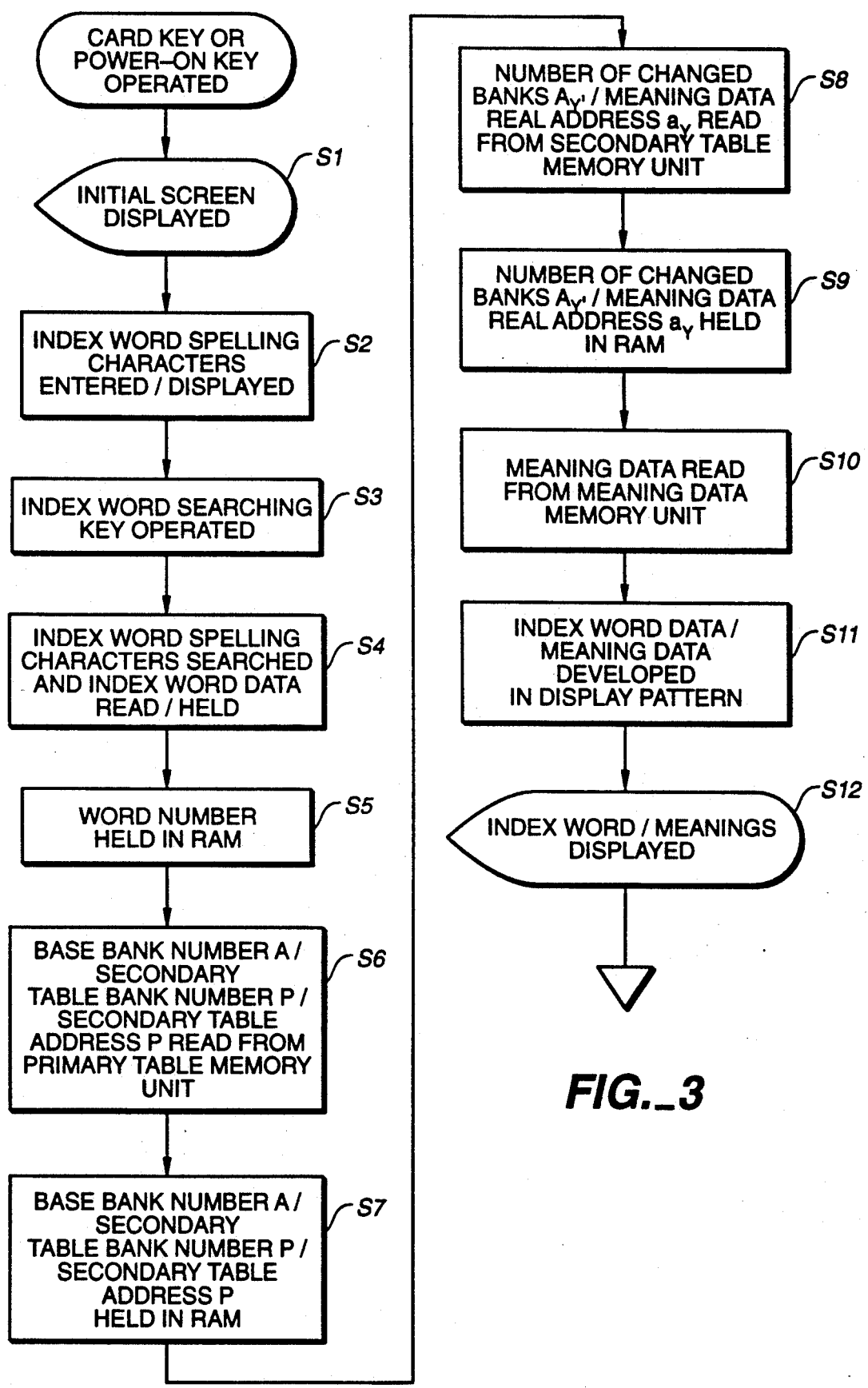
FIG._3

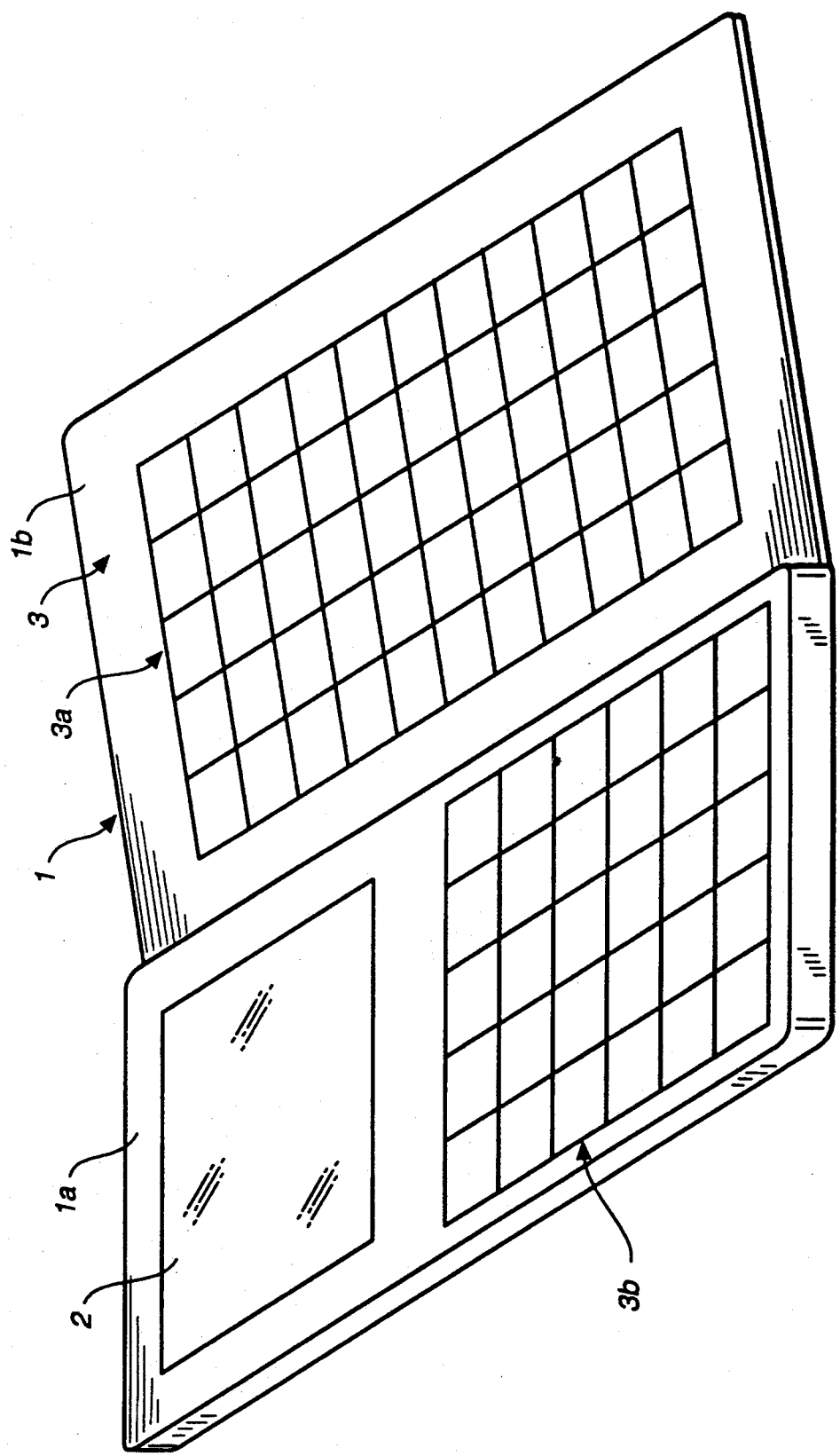
FIG._4

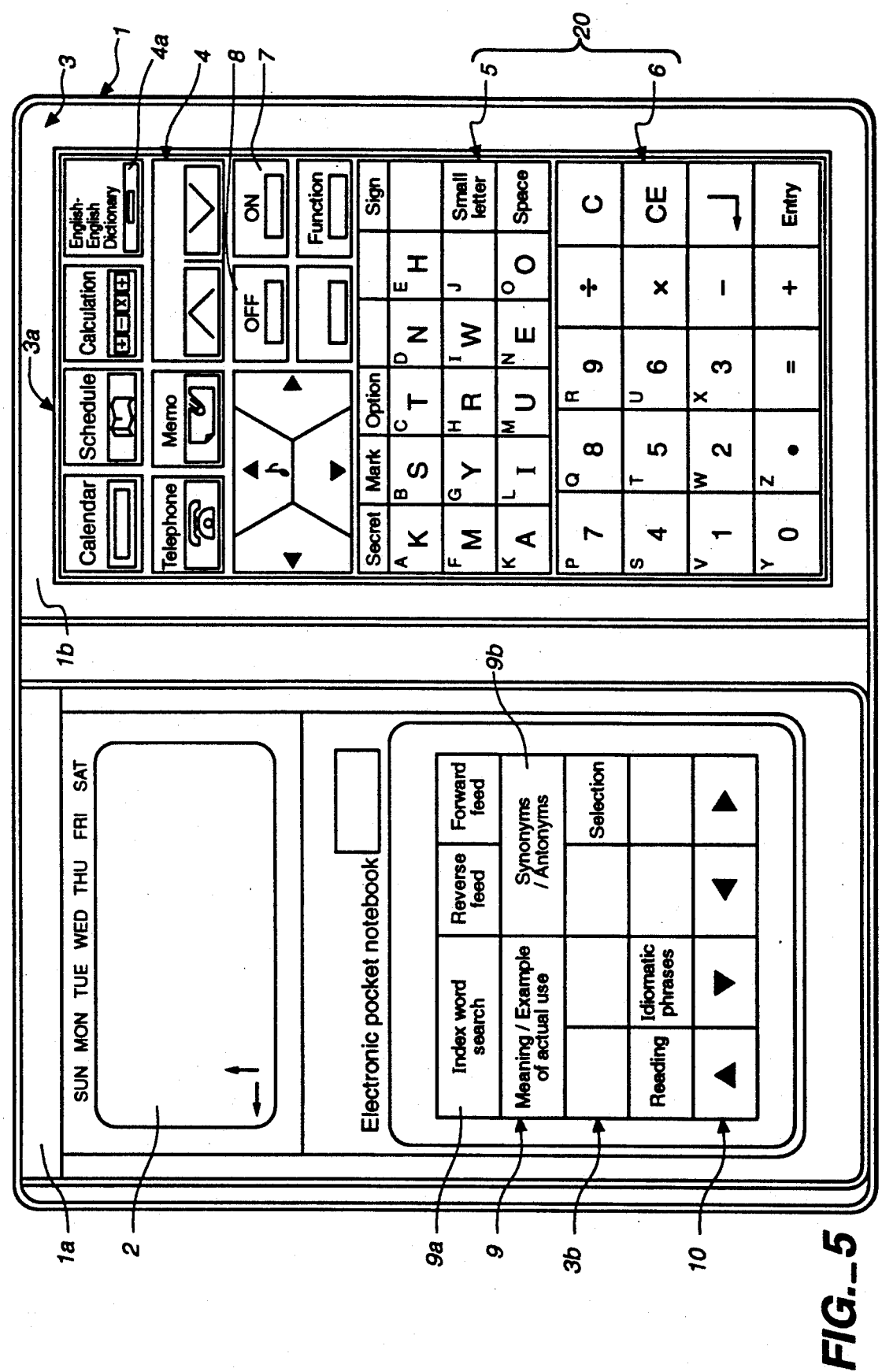
FIG._5

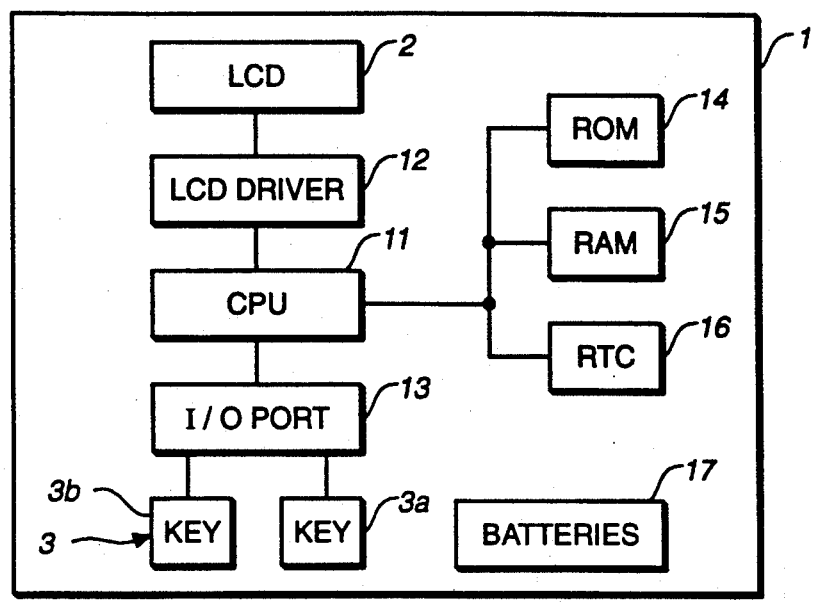
FIG._6
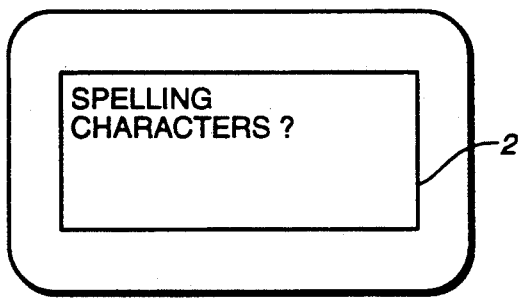
FIG._7A
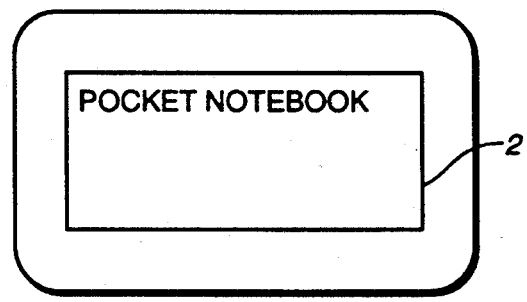
FIG._7B
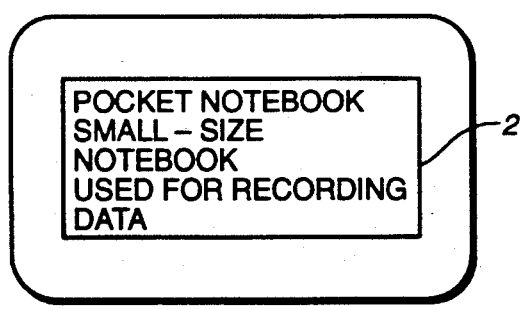
FIG._7C
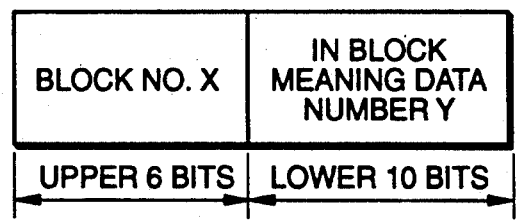
FIG._8
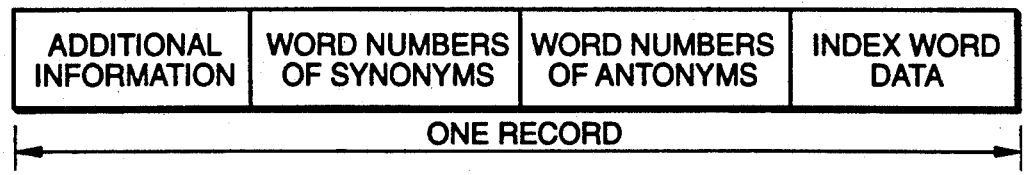
FIG._10

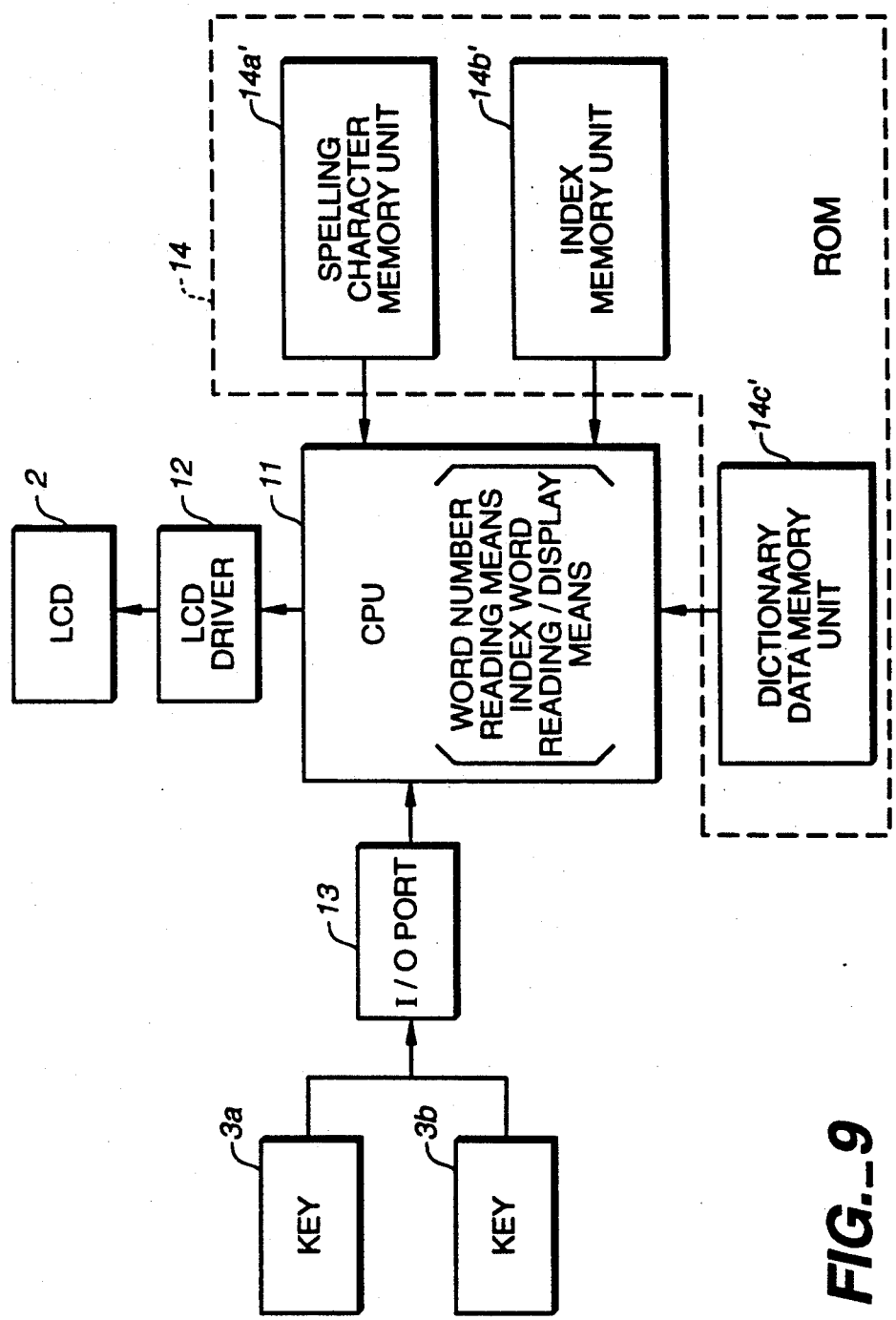
FIG._9

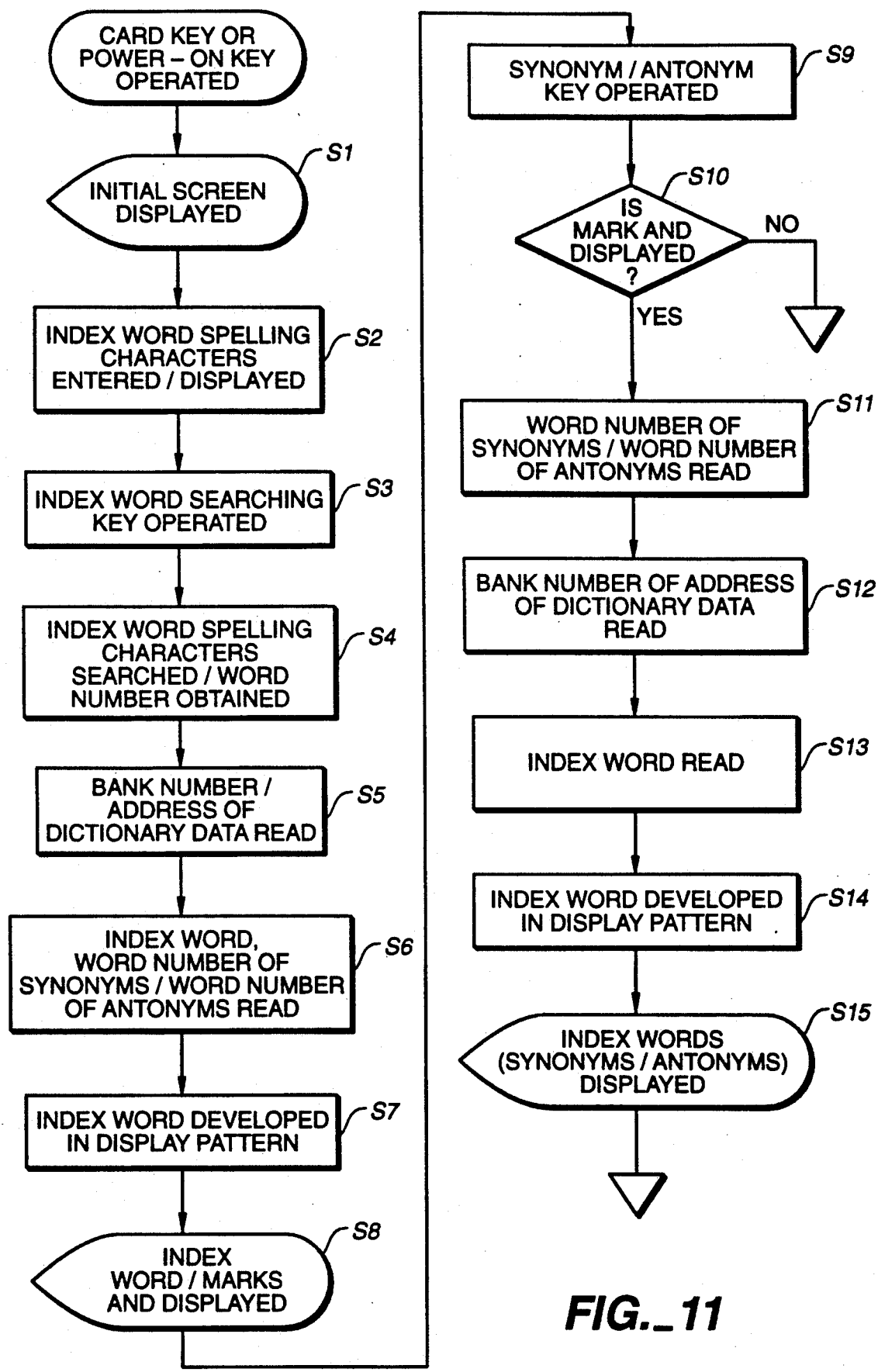
FIG._11

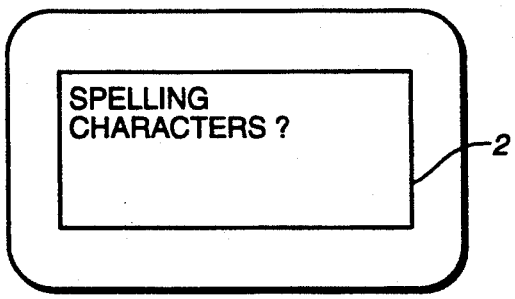
FIG._12A
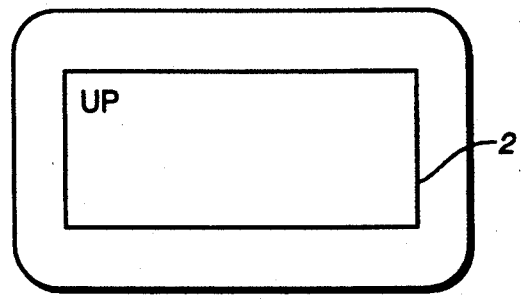
FIG._12B
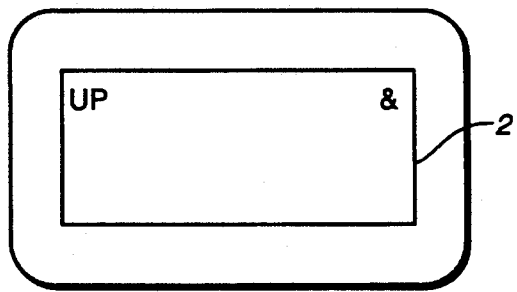
FIG._12C
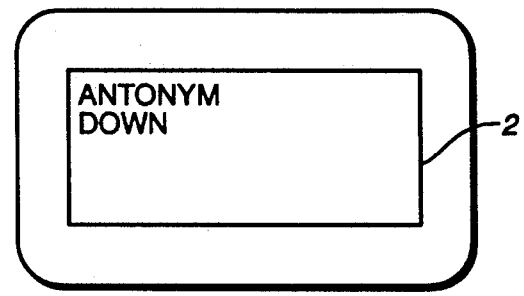
FIG._12D
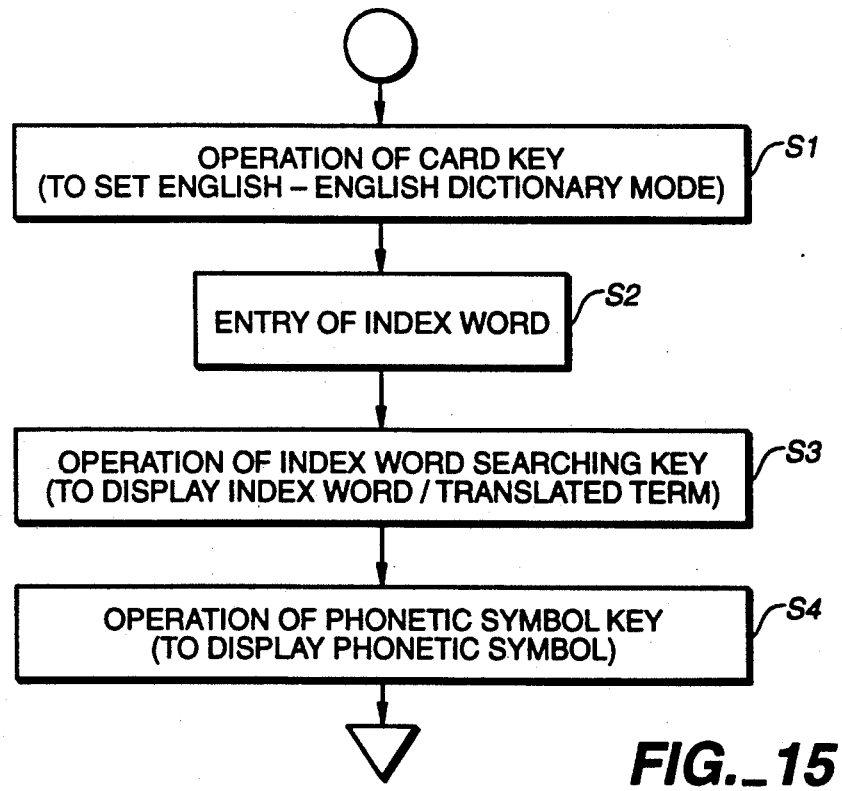
FIG._15

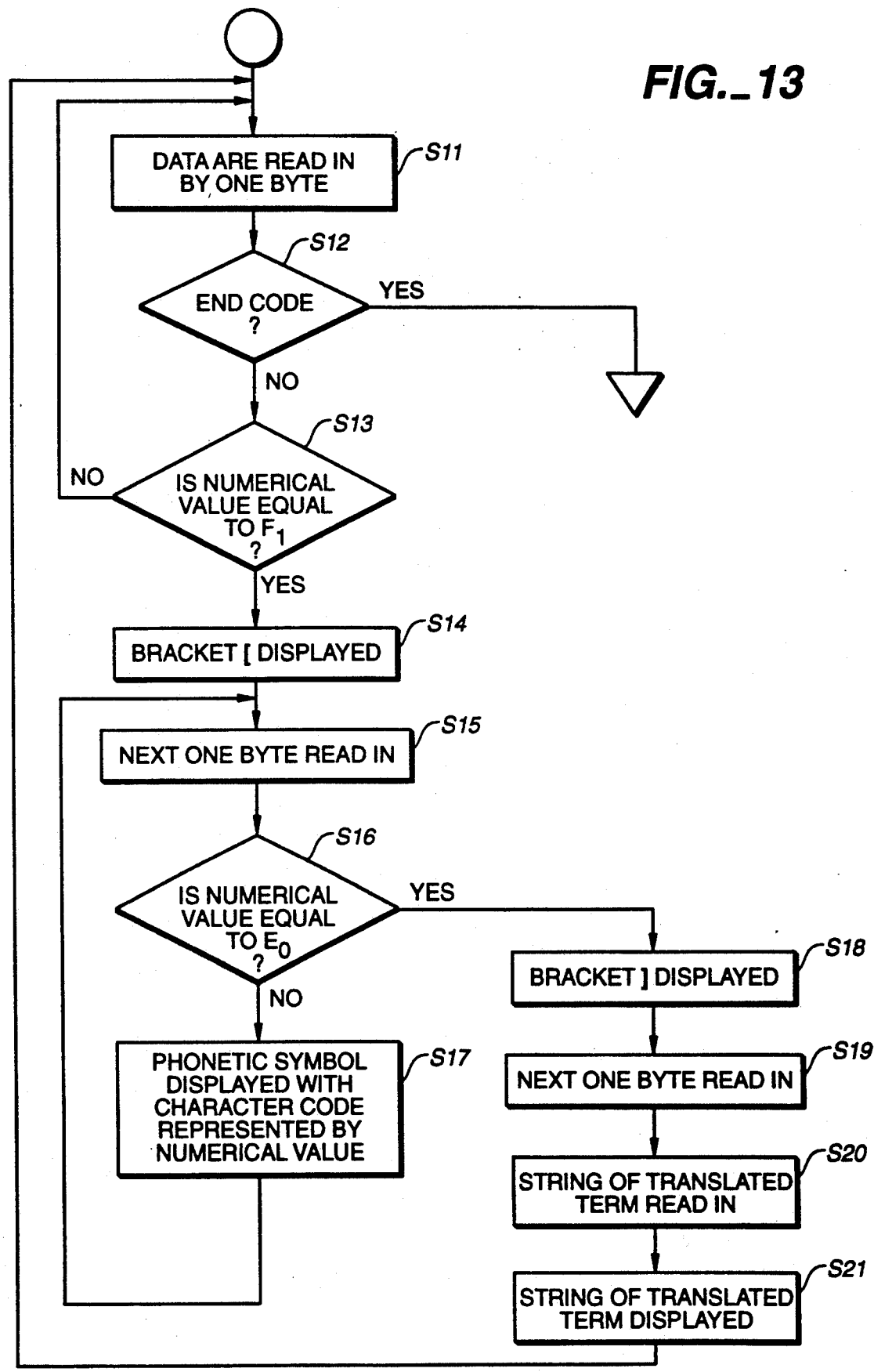
FIG._13

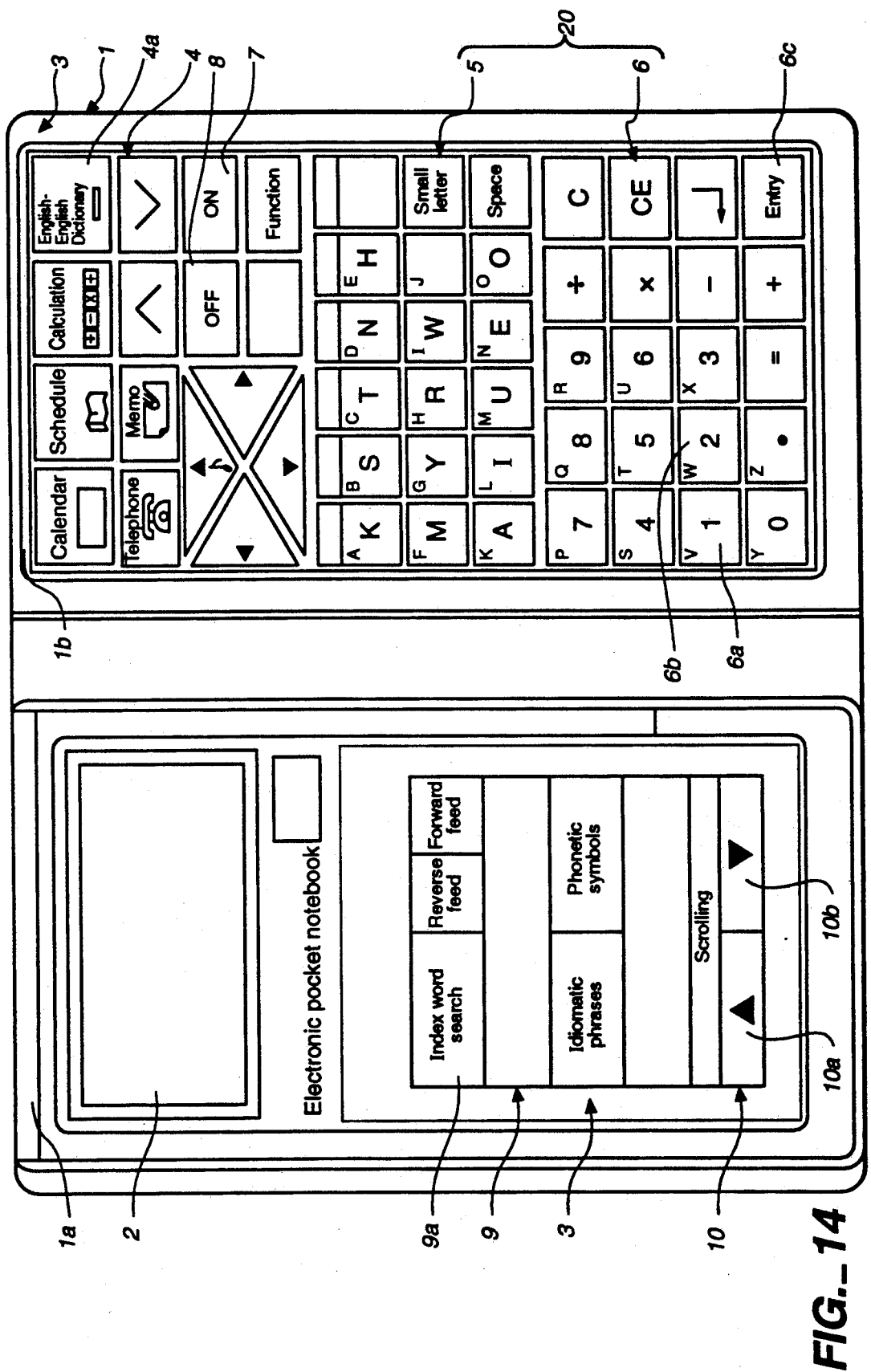
FIG._14

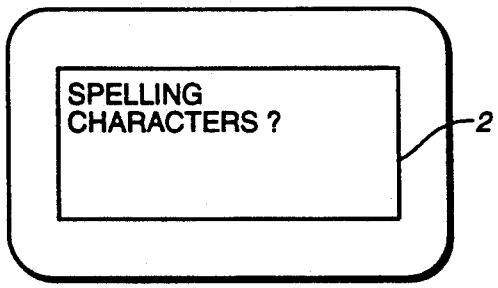
FIG._16A
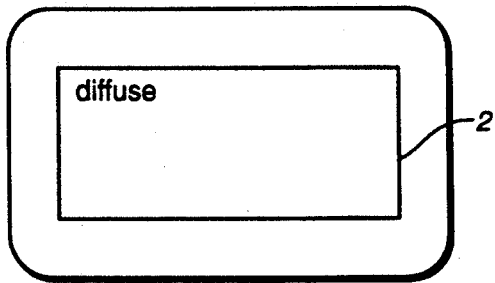
FIG._16B
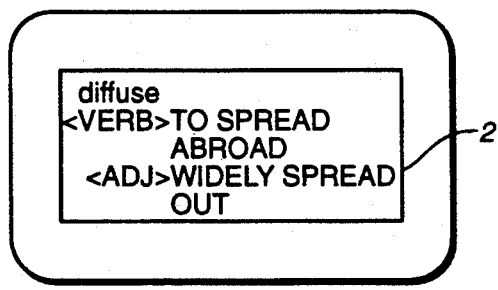
FIG._16C
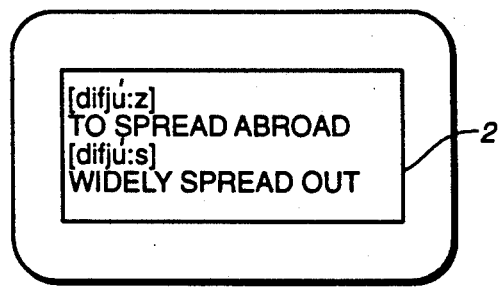
FIG._16D
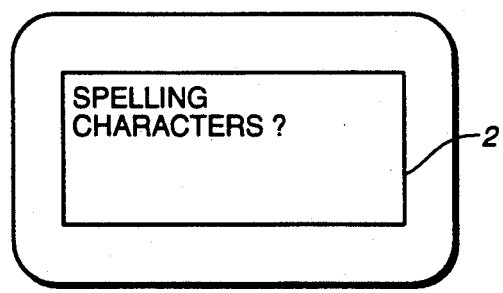
FIG._18A
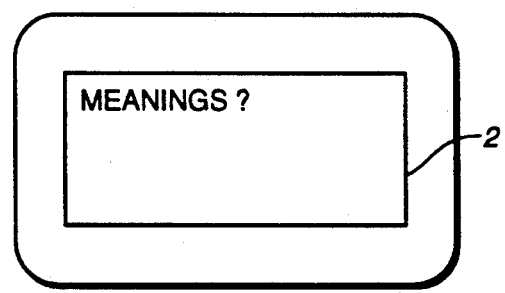
FIG._18B
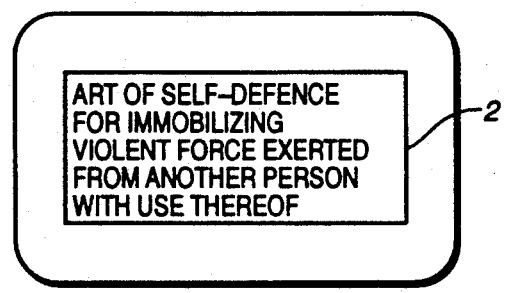
FIG._18C
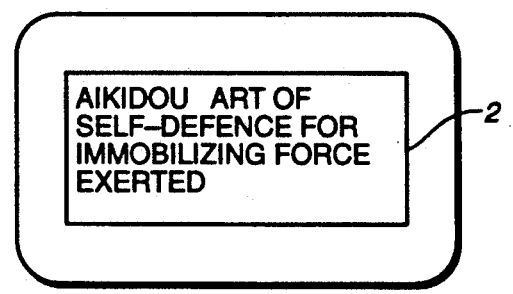
FIG._18D

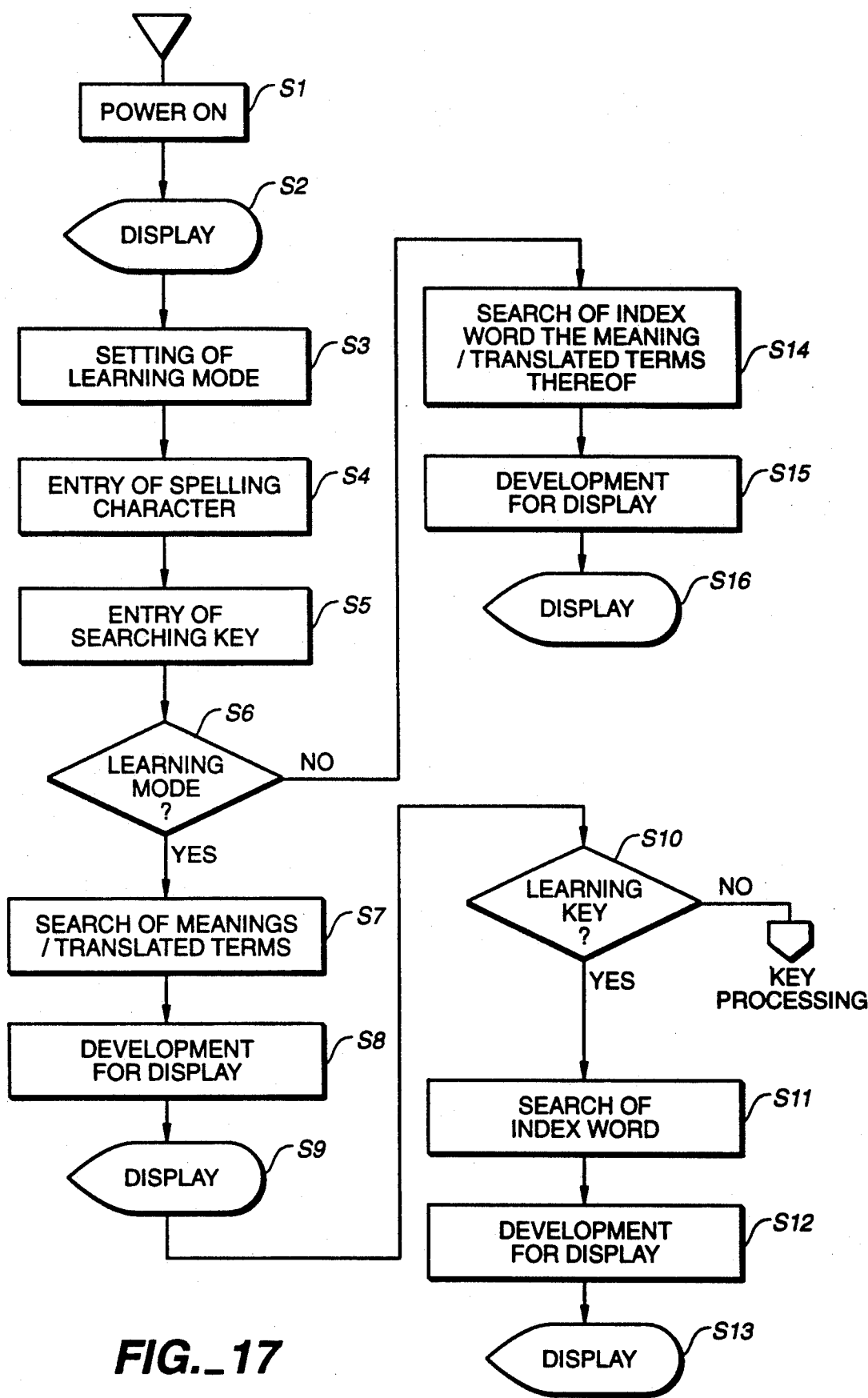
FIG._17

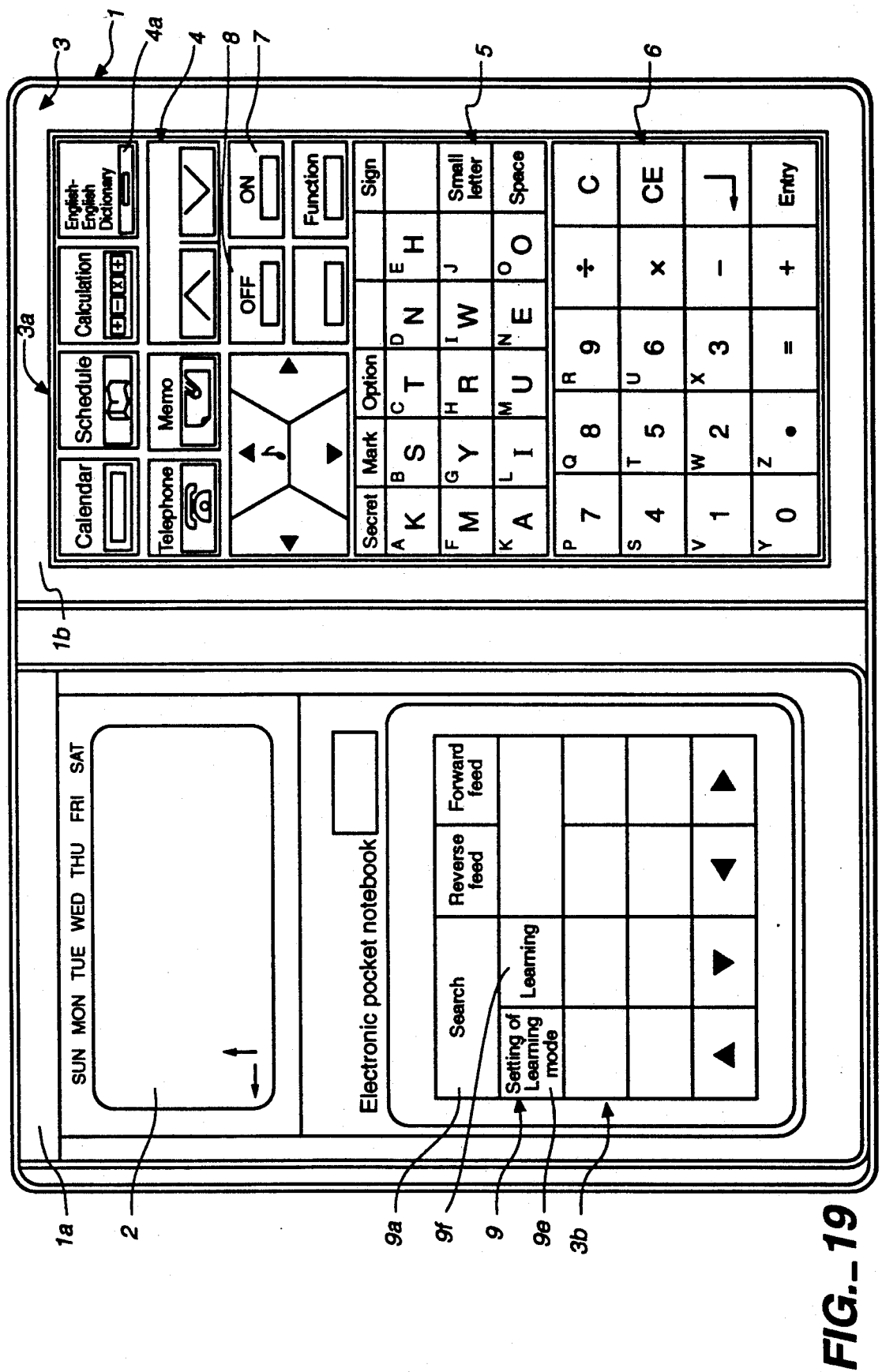
FIG._19

ELECTRONIC DEVICE/DICTIONARY WITH IMPROVED INFORMATION STORAGE: MEMORY CAPACITY RATIO

FIELD OF THE INVENTION

The present invention relates to an information searching apparatus to be used in an electronic-type dictionary, an electronic-type learning machine or the like, which is adapted to search and display, with respect to an index word, the meanings and/or the translated terms, the synonyms, the antonyms, the phonetic symbols, and the like.

BACKGROUND OF THE INVENTION

There is known a memory apparatus for storing a large quantity of information to be searched, which comprises a plurality of banks serving as memory units set according to the circuit restrictions and the like such as the number of address signal lines. To read such information stored in such a memory apparatus, it is required to designate the bank No. representing the bank containing the information, and the real address representing the area in this bank in which the information is being stored. A conventional information searching apparatus has a table memory unit containing the bank No. and the real address of each information to be searched, and is arranged such that the information stored in the memory is read by referring to this table memory unit.

In the conventional information searching apparatus above-mentioned, the table memory unit should contain bank Nos. and real addresses, the number of each of which is the same as the number of information data to be searched. Accordingly, the memory capacity required for the information searching apparatus in its entirety is apt to be increased. In particular, when the increased number of banks is set so that a large quantity of information data to be searched may be stored and searched, a further increased memory capacity is required.

In this connection, there may be proposed a memory unit in which a plurality of types of information data to be searched are arranged in one block to which a bank No. is given, and there are stored bank Nos. of which number is the same as the number of the blocks. In this arrangement, however, if one block extends over two or more banks, one bank No. cannot correspond to one block. This not only makes it complicate to control the bank Nos., but also prevents the memory capacity required for the table memory unit from being minimized. This presents the problem that there cannot be readily stored and searched a large quantity of information data of which lengths are not always constant.

A conventional dictionary of the print type generally contains, with respect to each of index words, a plurality of relevant parts of speech or translated terms. When an index word has different phonetic symbols for the respective parts of speech or translated terms thereof, each of the phonetic symbols is arranged continuously after the relevant part of speech or translated term. More specifically, such arrangement enables the user to readily understand and make sure of the part of speech or translated term to which each phonetic symbol relates. On the other hand, even though the phonetic symbols are arranged continuously after the relevant parts of speech or translated terms, the user may readily take a look at them. Accordingly, even though the user desires all the phonetic symbols of an index word, the user may readily refer to them, regardless of the relevant parts of speech or translated terms of the index word. In particular, the phonetic symbols are generally described as put in parentheses (..., ...) or the like. This further facilitates the reference of all the phonetic symbols of each index word.

There is lately seen a tendency to use, instead of a dictionary of the type that data are being printed on paper, an information searching apparatus such as a so-called electronic-type dictionary, an electronic-type learning machine or the like which contains and is adapted to display the translated terms of index words. In such an information searching apparatus, it now becomes possible to store not only translated terms but also phonetic symbols, with the recent trend that the capacity of the memory element is increased. As to the display of phonetic symbols, it is proposed to arrange the apparatus such that the phonetic symbols are displayed continuously after the relevant parts of speech or translated terms, as done in the print-type dictionary above-mentioned. However, in a conventional apparatus of the type above-mentioned, the amount of information data at which the user can take a look, is generally limited and small as compared with the print-type dictionary. Provision may be made such that the phonetic symbols are displayed continuously after the relevant parts of speech or translated terms as above-mentioned. With such provision, however, if it is desired to learn all the phonetic symbols with respect to an index word regardless of the relevant parts of speech or translated terms thereof, it is required to often scroll or jump the display screen or to search the phonetic symbols. This causes the operation to be multi-staged or complicated, resulting in decrease in maneuverability.

Examples of the conventional information searching apparatus include apparatus comprising: an index word searching key; a synonym and antonym key; dictionary data memory means containing index words, the synonyms and antonyms thereof as a series of dictionary data; and synonym & antonym reading and display means for reading and displaying the index words and the synonyms & antonyms thereof stored in the dictionary data memory means. According to this apparatus, when the synonym & antonym key is operated while an index word is displayed after the index word searching key has been operated, the synonyms and antonyms stored, as a series of dictionary data, together with the displayed index word, are read and displayed by the synonym & antonym reading and displaying means.

According to the conventional apparatus above-mentioned, the dictionary data memory means contains index words, and the synonyms and antonyms thereof, as a series of dictionary data. Accordingly, there is required, for each index word, a memory area corresponding to the lengths of strings of the synonyms and antonyms of the index word. Thus, the memory capacity required for the dictionary data memory means in its entirety is apt to be increased. In particular, when the number of index words is increased, a considerable memory capacity is required.

In this connection, there is known an information searching apparatus having dictionary data memory means which contains, instead of the synonyms and antonyms of index words, the bank Nos. or addresses of areas which contain the index words representing such synonyms and antonyms, as data stored together with the index words. According to this apparatus, the sizes of dictionary data memory areas required for indicating the synonyms and antonyms for the respective index words, may be made constant regardless of the lengths of the strings of the synonyms and antonyms. However, even in this apparatus, if the number of index words is increased, there is also increased the number of data representing bank Nos. or addresses for indicating the areas in which the respective index words are stored. Accordingly, this apparatus still presents the problem that a considerable memory capacity is required if the number of index words is increased to a very large extent.

Instead of the print-type dictionary, there is proposed an information searching apparatus such as a so-called electronic-type dictionary, electronic-type leaning machine or the like, including entry keys for entering spelling characters, display means and a display device adapted to display, when spelling characters are entered, the index word corresponding to the characters thus entered, and the meanings or translated terms of the index word. This apparatus further includes dictionary data memory means containing, in a merely collective manner, index words, and the meaning and translated terms thereof. According to this apparatus, provision is made such that, when the index word corresponding to entered spelling characters is searched, the index word, and the meanings and translated terms thereof are simultaneously displayed.

However, when the index words, and the meanings and translated terms thereof are simultaneously displayed, it is a matter of course that the user can see the index words together with the meanings and translated terms thereof. It is therefore not possible for the user to make sure, at the time of reviewing his lesson, whether or not he has actually memorized the index words. In other words, such an information searching apparatus presents the problem that the apparatus cannot be used for other purposes (learning or the like) than the purpose of checking the meanings or translated terms of index words.

SUMMARY OF THE INVENTION

It is an object of the present invention to provide an information searching apparatus in which information to be searched may be simply controlled, and information to be searched having different lengths may be readily stored and searched.

It is another object of the present invention to provide an information searching apparatus in which the memory capacity required for controlling information to be searched may be reduced and, even though a large quantity of information is stored and searched, this memory capacity is not excessively increased.

It is a further object of the present invention to provide an information searching apparatus with which the user may readily and quickly learn all the phonetic symbols of an index word regardless of the parts of speech or translated terms relevant to the index word, and with which the user may also readily and quickly learn or make sure of the parts of speech or translated terms to which the phonetic symbols are respectively related, and which assures a good maneuverability even though the operation is complicated or multi-staged.

It is still another object of the present invention to provide an information searching apparatus which minimizes the memory capacity required for dictionary data representing synonyms and antonyms, regardless of the lengths of the strings thereof.

It is a still further object of the present invention to provide an information searching apparatus with which the user may make sure, in a learning mode, whether or not he has memorized the index word, and with which, when he feels uncertain of or has not memorized the index word, he may make sure of or memorize the same at the moment.

It is yet another object of the present invention to provide an information searching apparatus with which the user may readily and quickly learn, in a dictionary mode, index words and the meanings or translated terms thereof.

To achieve the objects above-mentioned, the information searching apparatus in accordance with the present invention comprises:

information memory means having a plurality of banks for storing a plurality of types of information data to be searched, a predetermined number of types of information data to be searched being grouped in one block;

secondary table memory means containing, for every information data to be searched, (i) the number of changed banks which is the difference between (a) the base bank No., i.e., the top bank No. of the area containing the first information data to be searched of a block containing information data to be searched and (b) the top bank No. of the area containing the information data to be searched, and (ii) the real address of the information to be searched which is the top address of the area containing the information data to be searched;

primary table memory means containing, for every block, (i) the top bank No. of the area containing the number of changed banks and the real address of the first information data to be searched of each block in the secondary table memory means, (ii) secondary table bank Nos. serving as addresses, (iii) secondary table addresses and (iv) the base bank No. of each block;

primary table reading means for reading, from the primary table memory means, (i) the base bank No. of a block containing information data to be searched, (ii) the secondary table bank No. and (iii) the secondary table address, based on the block No. representing the block containing information data to be searched, secondary table reading means for reading, from the secondary table memory means, the number of changed banks for information data to be searched and the real address of the information to be searched, based on (i) the in-block information number representing where the real address of the information data to be searched is stored in the block in the secondary table memory means, (ii) the secondary table bank No. and (iii) the secondary table address; and information data reading means for reading, from the information memory means, the information data to be searched, based on the base bank number, the number of changed banks and the real address of the information to be searched.

According to the arrangement above-mentioned, when there are supplied (i) a block number representing the block containing information to be searched, and (ii) an in-block information number representing where the real address of the information to be searched is stored in the block in the secondary table memory means, the primary table reading means reads, from the primary table memory means, the base bank No. of the block containing the information to be searched, the secondary table bank No. and the secondary table address, based on the block number.

The secondary table reading means reads, from the secondary table memory means, the number of changed banks for the information to be searched and the real address of the information to be searched, based on the in-block information number, the secondary table bank No. and the secondary table address.

The information reading means reads, from the information memory means, the information to be searched, based on (i) the bank No. obtained by adding the base bank No. to the number of changed banks, and (ii) the real address of the information to be searched. Thus, the base bank No. stored in the primary table memory means is added to the number of changed banks stored in the secondary table memory means. Accordingly, even though one block extends over two or more banks, the bank No. of each information to be searched may be obtained. Therefore, the information to be searched may be readily read. Further, there may be stored the base bank Nos. of which number is equal to the number of blocks. Further, there is required, for data as to the number of changed banks, a memory area smaller than that for the bank Nos. Accordingly, even though a large quantity of information to be searched is to be stored and searched, the memory capacity may not be considerably increased.

The information searching apparatus in accordance with another embodiment of the present invention comprises:

display means for displaying an index word, parts of speech, translated terms, phonetic symbols and the like;

index word input means for entering an index word;

index word searching means for designating the display of the parts of speech and the translated terms of an entered index word;

phonetic symbol designating means for designating the display of the phonetic symbols of the entered index word; and control means for displaying the parts of speech and translated terms of the entered index word when the index word searching means is operated after the index word input means has been operated, and for continuously displaying a plurality of phonetic symbols, if any, of the index word when the phonetic symbol designating means is operated, and for displaying, when the displayed phonetic symbols relate to specific parts of speech and/or specific translated terms of the index word out of the parts of speech and/or translated terms thereof, such specific parts of speech and/or specific translated terms, together with the phonetic symbols.

According to the arrangement above-mentioned, when the phonetic symbol key is operated, the control means may continuously display, on the display means, a plurality of phonetic symbols, if any, for the index word. Accordingly, all the phonetic symbols for the index word may be readily and quickly learned, regardless of the relevant parts of speech or translated terms.

Further, when the displayed phonetic symbols relate to specific parts of speech and/or specific translated terms of the index word out of the parts of speech and/or translated terms thereof, the control means is operated to display the related specific parts of speech and/or translated terms. Accordingly, the user may readily and quickly learn or make sure of the parts of speech and/or translated terms to which the phonetic symbols are respectively related.

The information searching apparatus in accordance with a further embodiment of the present invention comprises:

display means for displaying the spelling characters, synonyms and antonyms of an index word;

index word input means for entering the index word spelling characters;

index word searching means for searching the index word;

synonym and antonym searching means for searching the synonyms and antonyms of the index word;

whereby the index word corresponding to entered spelling characters is displayed when the index word searching means is operated after the index word input means has been operated to enter the index word spelling characters, and the synonyms and/or antonyms of the index word are displayed when the synonym and antonym searching means is operated;

dictionary data memory means containing, as a series of dictionary data for every index word, an index word, the word Nos. of the synonyms of the index word, and/or the word Nos. of the antonyms of the index word, in an area determined by the word No. set for the index word;

word No. reading means for reading the word Nos. for the synonyms and/or the word Nos. for the antonyms, stored in the dictionary data memory means; and index word reading & display means for reading and displaying, on the display means, the index words stored in the areas determined by the word Nos. for the synonyms and/or the word Nos. for the antonyms in the dictionary data memory means when the synonym and antonym searching means is operated, these word Nos. being read by the word No. reading means.

According to the arrangement above-mentioned, the word number reading means reads the word numbers of the synonyms of an index word and/or the word numbers of antonyms of the index word, stored in the dictionary data memory means as a series of dictionary data together with the index word. When the synonym and antonym key is operated, the index word reading means reads and displays, on the display means, the index words stored in areas determined by the word Nos. read by the word number reading means, in the dictionary data memory means. More specifically, a series of dictionary data such as index words, are stored in areas determined by the word Nos. in the dictionary data memory means. Accordingly, it is sufficient to store only the word Nos. as dictionary data representing synonyms or antonyms. That is, when there are read index words stored in the dictionary data memory means based on the word Nos., the data thus read may be displayed as the synonyms or antonyms. Thus, it is sufficient to store only the word Nos. as dictionary data representing the synonyms or antonyms in the dictionary data memory means. Accordingly, the sizes of the dictionary data representing the synonyms or antonyms may be constant, regardless of the lengths of the strings of the synonyms or antonyms. Further, the word Nos. may be so set as to require a small memory area as compared with the memory areas for data such as the bank Nos., addresses or the like. This may minimize the memory capacity required for the dictionary data memory means in its entirety.

The information searching apparatus in accordance with still another embodiment of the present invention comprises:

display means for displaying the index word corresponding to entered spelling characters, the meanings and/or translated terms of the index word;

dictionary data memory means containing, in a separated manner, index words, and the meanings and/or translated terms of the index words;

index word input means for entering the index word spelling characters;

learning mode setting means for switching the operation mode to a learning mode; and control means for displaying, on the display means, the meanings and/or translated terms of the index word corresponding to spelling characters without display of the index word when, in the learning mode, the spelling characters are entered and the index word searching means is operated, and for displaying the index word only when a predetermined operation is made.

According to the arrangement above-mentioned, when, in the learning mode, the index word searching means is operated after spelling characters have been entered, the index word corresponding to the entered spelling characters is not displayed, but the meanings and/or translated terms of the index word are displayed. Thus, this apparatus may be used for learning or the like for checking whether or not the user memorizes the index word. Even in the learning mode, when a predetermined operation is made, there may be displayed the index word together with the meanings and/or translated terms thereof, or there may be displayed only the index word. Accordingly, the user may immediately make sure of or memorize the index word in a treacherous memory or which he does not remember. On the other hand, in other mode than the learning mode, for example the English-English dictionary mode, when spelling characters are entered and the index word searching means is operated, there may be simultaneously displayed the index word corresponding to entered spelling characters, and the meanings and/or translated terms of the index word. That is, a so-called normal display processing may be executed. Thus, the index word and the meanings or translated terms thereof may be readily and quickly checked.

BRIEF DESCRIPTION OF THE DRAWINGS

FIG. 1 to FIG. 19 show, in detail, information searching apparatus in accordance with the present invention;

FIG. 1 is a block diagram of the arrangement of a main portion of a control unit of the information searching apparatus;

FIG. 1 is a view illustrating a memory arrangement of a primary table memory unit, a secondary table memory unit and meaning data table memory unit;

FIG. 3 is a flow chart illustrating the operations executed in a CPU;

FIG. 4 is a perspective view of the arrangement of the information searching apparatus;

FIG. 5 is a front view of the arrangement of the information searching apparatus;

FIG. 6 is a block diagram of the arrangement of a control unit;

FIG. 7(a), 7(b) and 7(c) are views illustrating the display examples of an LCD;

FIG. 8 is a view illustrating the data arrangement in a word No.;

FIG. 9 is a block diagram of the arrangement of a main portion of a control unit for displaying the synonyms and antonyms of an index word;

FIG. 10 is a view of the data arrangement in dictionary data;

FIG. 11 is a flow chart illustrating the operations executed in a CPU;

FIG. 12(a), 12(b), 12(c) and 12(d) are views illustrating the display examples of an LCD;

FIG. 13 is a flow chart illustrating the operations executed in a CPU;

FIG. 14 is a front view illustrating an example of the arrangement of the information searching apparatus of the present invention so arranged as to display, with respect to an entered index word, the translated terms, the parts of speech, the idiomatic phrases, the phonetic symbols and the like;

FIG. 15 is a flow chart of an example of the operations of the information searching apparatus;

FIG. 16(a), 16(b), 16(c), and 16(d) are views illustrating the display examples of an LCD;

FIG. 17 is a flow chart of an example of the operations of the information searching apparatus;

FIG. 18(a), 18(b), 18(c), and 18(d) are view illustrating the display examples of an LCD; and FIG. 19 is a front view of the arrangement of the information searching apparatus of the present invention in a learning mode.

DESCRIPTION OF THE EMBODIMENTS

The following description will discuss, with reference to FIGS. 1 to 8, an embodiment of the present invention which is applied to an electronic-type dictionary apparatus as an information searching apparatus adapted to search and display the meanings of an index word when the spelling characters thereof are entered.

As shown in FIGS. 4 and 5, the electronic-type dictionary apparatus has an openable body 1 in the form of a pocket notebook. The body 1 is provided at the upper part of the left-hand portion 1a thereof with a liquid crystal display device (hereinafter referred to as LCD) 2 serving as display means for displaying data contents such as a message, a calculation result, an index word, the meanings thereof, and the like. The LCD 2 has a dot matrix arrangement. Input key groups 3a, 3b for entering a variety of information data are respectively disposed at the right-hand portion 1b of the body 1 and the at the lower part of the LCD 2. These input key groups 3a, 3b form an input device 3.

The input key group 3a is provided at the upper part thereof with a mode setting key group 4 for calling and setting a variety of functions of the electronic-type dictionary apparatus. The mode setting key group 4 includes an English-English dictionary key 4a for setting an English-English dictionary mode, and a variety of keys for respectively setting modes of calender, schedule, calculation, telephone number and memo.

The input key group 3a is provided at the center part thereof with an alphabet key group 5 (for entering the characters from A to O) for entering character information in alphabet. The input key group 3a is also provided at the lower part thereof with a numerical value input key group 6 for entering numerical information when the apparatus is used as a calculator. Provision is made such that the numerical value input key group 6 is also used for entering portions of alphabets (P to Z). In other words, the alphabet key group 5 and the numerical value input key group 6 form index word input keys 20 for entering English index words.

A power-ON key 7, a power-OFF key 8 and other keys are disposed between the mode setting key group 4 and the alphabet key group 5. In the apparatus, the English-English dictionary key 4a also serves as the power-ON key 7, and vice versa. More specifically, provision is made such that, for example when the power-ON key 7 is operated, the English-English dictionary mode is set.

Disposed at the lower part of the input key group 3b are an operation key group 9 including an index word searching key 9a for executing a search for an index word, and other input keys. Disposed under the operation key group 9 is a scroll key group 10 for scrolling the display screen.

The following description will discuss the arrangement of a control unit of the electronic-type dictionary apparatus above-mentioned.

The control unit is housed in the body 1 and composed of a microcomputer with a CPU 11 centered. The CPU 11 is connected to the LCD 2 through an LCD driver 12. The LCD driver 12 is a driving circuit for driving the LCD 2 according to an instruction from the CPU 11. The various input keys of the input key groups 3a, 3b are connected to the CPU 11 through an I/O port 13. Accordingly, the CPU 11 may judge which input key has been pressed, based on the address of the I/O port 13.

The body 1 of the electronic-type dictionary apparatus includes a ROM 14, a RAM 15 and an RTC (Real Time Clock) 16 each of which is connected to the CPU 11.

The ROM 14 is a read-only memory having a plurality of banks and contains an operation program of the electronic-type dictionary apparatus and dictionary data such as index word data and the spelling characters thereof, and the like.

As shown in FIG. 1 and FIG. 2, the ROM 14 includes:

a meaning data memory unit 14c serving as information memory means for storing meaning data which are a plurality of types of information to be searched and which represent the meanings of a word corresponding to the spelling characters of each index word entered from the alphabet key group 5;

a secondary table memory unit 14b serving as secondary table memory means containing (i) the number of changed banks which is the difference between (a) the base bank No. i.e., the top bank No. in the area containing the first meaning data of the block containing the meaning data, each block being formed by the meaning data of, for example, 1024 words, and (b) the top bank No. in the area containing each meaning data, (ii) the meaning data real address which is the top address in the area containing each meaning data, such number of changed banks and meaning data real address being stored for each meaning data; and a primary table memory unit 14a serving as primary table memory means containing, for each block, (i) the top bank No. in the area containing the number of changed banks and the meaning data real address of the first meaning data in the block, (ii) the secondary table bank No. serving as an address, (iii) the secondary table address, and (iv) the base bank No. of the block, in the secondary table memory unit 14b.

The RAM 15 is a read/write random-access memory to be used for recording data entered from the input key groups 3a and 3b or at the time when the CPU 11 is operated. The RTC 16 is a real time clock which is a circuit for counting, in real time, current date and time according to a calender based on the date and time initially set by the input key group 3a and the like.

The body 1 of the electronic-type dictionary apparatus further incorporates batteries 17 for supplying power to the circuits above-mentioned. The batteries 17 are so arranged as to support the RAM 15 while the power of the electronic-type dictionary apparatus is turned OFF, so that the memory contents are held.

Based on the operation program in the ROM 14, the CPU 11 executes a processing according to data entered from the input keys. The CPU 11 then executes a variety of functions after the processing result has been displayed on the LCD 2. For example, the CPU 11 is adapted to serve as primary table reading means which obtains (i) a block No. representing the block containing the meaning data to be searched, based on the spelling characters of an index word entered from the alphabet key group 5, and (ii) an in-block meaning data No. representing where the real address of the meaning data to be searched is stored in the block. The primary table reading means also reads, from the primary table memory unit 14a, the base bank No. of the block containing the meaning data, the secondary table bank No. and the secondary table address, based on the block No.

The CPU 11 is also adapted to serve as secondary table reading means which reads, from the secondary table memory unit 14b, the number of the changed banks for the meaning data to be searched and the meaning data real address, based on the in-block meaning data No., the secondary table bank No. and the secondary table address.

The CPU 11 is also adapted to serve as information reading means for reading, as information to be searched, the meaning data from the meaning data memory unit 14c based on the base bank No., the number of changed banks and the meaning data real address.

As to the CPU 11 having the arrangement above-mentioned, the following description will discuss, with reference to a flow chart in FIG. 3, the operations executed in the CPU 11 adapted to display the meanings of a word corresponding to index word spelling characters entered from the alphabet key group 5 and the numerical value input key group 6.

When the English-English dictionary key 4a or the power-ON key 7 is operated, the English-English dictionary mode is set. For example as shown in FIG. 7(a), the initial screen requiring the entry of spelling characters of an index word is then displayed on the LCD 2 (S1). Then, the spelling characters of the index word are entered by operating the alphabet key group 5 and displayed on the LCD 2 (S2). For example, when an index word "pocket notebook" is entered from the alphabet key group 5, data are displayed as shown in FIG. 7(b).

Provision may be made such that there may be received, at the step S2, not only the entry of spelling characters of an index word, but also the operation for instructing the display of words stored before and after the currently displayed words.

When the operation of an index word searching key 9a is received (S3) and the index word searching key 9a is operated, the word having spelling characters identical with those entered from the alphabet key group 5 is searched in the index word spelling characters stored in the ROM 14, and the index word data corresponding to the entered spelling characters are read from the ROM 14 and held in the RAM 15 (S4). For example, when the spelling characters "pocket notebook" as shown in FIG. 7(c) have been entered, the index word data representing "pocket notebook" are read and held.

Also, the RAM 15 holds the word No. set for the searched index word (S5). For example as shown in FIG. 8, the word No. has (i) upper 6 bits serving as a block No. X which represents the block containing the meaning data to be searched, and (ii) lower 10 bits serving as the in-block meaning data No. Y which represents where the real address of the meaning data to be searched is stored in the block in the secondary table memory unit 14b.

Based on the block No. X on the upper 6 bits of the word No., there are read from the primary table memory unit 14a (S6) and held in the RAM 15 (S7), the base bank No. A of the block containing the meaning data, the secondary table bank No. P and the secondary table address p.

More specifically, for example when the data amount of the base bank No. A, the secondary table bank No. P and the secondary table address p per block in the primary table memory unit 14a, is equal to $\alpha$ bytes, there are read and held the data stored in an area of $\alpha$ bytes on and after the address of block No. X $\times \alpha$ in the primary table memory unit 14a.

Further, based on (i) the in-block meaning data No. Y on the lower 10 bits of the word No., and (ii) the secondary table bank No. P and the secondary table address p held as read from the primary table memory unit 14a, there are read from the secondary table memory unit 14b (S8) and held in the RAM 15 (S9), the number of changed banks A$\gamma'$ for the meaning data to be searched and the meaning data real address a$\gamma$.

More specifically, for example when the data amount of the number of changed banks A$\gamma'$ and the meaning data real address a$\gamma$ per one meaning data in the secondary table memory unit 14b, is equal to $\beta$ bytes, there are read and held data stored in an area of $\beta$ bytes on and after the address represented by the secondary table address p+(in-block meaning data No. Y $\times \beta$) of the bank represented by the secondary table bank No. P in the secondary table memory unit 14b.

Based on the base bank No. A, the number of changed banks A$\gamma'$ and the meaning data real address a$\gamma$, the meaning data are read from the meaning data memory unit 14c (S10).

In other words, there are read the meaning data stored on and after the address represented by the meaning data real address a$\gamma$ in the bank represented by (base bank No. A + the number of changed banks A$\gamma'$) in the meaning data memory unit 14c, i.e., the meaning data representing the meanings of the word corresponding to the index word spelling characters entered from the index word searching key 9a.

The index word data held in the RAM 15 and the meaning data read from the meaning data memory unit 14c are coded-data. These coded data are then developed in a display pattern (S11) and displayed on the LCD 2 (S12). For example, when the index word "pocket notebook" is entered from the alphabet key group 5 as shown above, there are displayed the index word "pocket notebook" and a string representing the meanings of "pocket notebook", i.e., "◇ small-size notebook used for recording data".

Accordingly, even though one block extends over two or more banks, the respective bank Nos. for the meaning data may be readily obtained by adding the base bank No. A to the number of changed banks A$\gamma'$. Accordingly, even though a bank No. has not been stored for each meaning data, there may be securely searched meaning data contained in a block extending over two or more banks. Further, it is sufficient to store the base bank Nos. of which number is identical with the number of blocks. Accordingly, a great memory capacity is not required, even though a large quantity of data having different lengths such as the meaning data above-mentioned, are stored.

The following description will discuss an embodiment of the electronic-type dictionary apparatus adapted to display the synonyms and antonyms of an entered index word. For convenience sake, like parts or parts having like functions as those used in the description above-mentioned are designated by like numerals used therein. The detailed description of such like parts or parts having like functions is here omitted.

According to this embodiment, when the index word searching key as index word searching means is operated after index word spelling characters have been entered by operating the alphabet keys, the index word corresponding to the entered spelling characters is displayed. When a synonym & antonym key 9b as synonym & antonym searching means is then operated, the synonyms and/or antonyms of the index word are displayed. This embodiment is outlined below with reference to FIGS. 9 to 12.

The input key group 3b (See FIG. 5) is provided at the upper part thereof with the synonym & antonym key 9b for displaying synonyms and antonyms, the key 9b being disposed under the index word searching key 9a. The ROM 14 contains a synonym and antonym operating program. For example as shown in FIG. 9, the ROM 14 includes:

a spelling memory unit 14a' containing the spelling characters corresponding to a plurality of index words in order of the word Nos. respectively set for the index words;

a dictionary data memory unit 14c' serving as dictionary data memory means containing, as a series of dictionary data for every index word, an index word and additional information such as the word Nos. corresponding to the synonyms of the index word, the word Nos. corresponding to the antonyms of the index word, the parts of speech of the index word, as shown in FIG. 10; and an index memory unit 14b' containing, at addresses obtained by calculations based on the word Nos., the bank Nos. and addresses of the areas which contain the dictionary data in the dictionary data memory unit 14c'.

For an index word having neither synonyms nor antonyms, the dictionary data memory unit 14c' of the ROM 14 contains, for example, "0" instead of the word Nos. Alternatively, provision may be made such that the presence and absence of the synonyms or antonyms of index words are stored, in the form of flags, in the additional information above-mentioned, and no word No. memory area is disposed for such index word having neither synonyms nor antonyms.

In the arrangement above-mentioned, the spelling characters corresponding to index words are stored in order of the word Nos. respectively set for the index words. Instead of such arrangement, the index memory unit 14b' may be arranged such that the spelling characters and the word Nos. are stored in a corresponding manner. Alternatively, when the dictionary data stored in the dictionary data memory unit 14c' have a predetermined size, the bank Nos. and addresses may be obtained, by calculations or the like, directly from the word Nos. without disposition of the index memory unit 14b'.

The CPU 11 is adapted to serve as word No. reading means which is operated as outlined below.

Based on data entered from the input keys, a processing is executed and a variety of functions are executed by displaying the processing results on the LCD 2. For example, searched in the index word spelling characters stored in the spelling characters memory unit 14a' is a word having spelling characters identical with the spelling characters entered from the index word input keys 20. The word No. of the corresponding index word is then obtained. Simultaneously, there are read the word Nos. corresponding to the synonyms of the index word, and/or the word Nos. corresponding to the antonyms of the index word, stored in the dictionary data memory unit 14c'.

The CPU 11 is also adapted to serve as index word reading and display means which is operated as outlined below.

When the synonym & antonym key 9b is operated, there are read the bank Nos. and addresses of areas containing dictionary data in the dictionary data memory unit 14c', which are stored at the addresses obtained by calculations made based on the word Nos. corresponding to the synonyms and/or the word Nos. corresponding to the antonyms, which have been read by the word No. reading means, in the index word memory unit 14b'. Then, there are read the index words stored in the dictionary data memory unit 14c' at the areas thereof designated by the bank Nos. and addresses thus read, i.e., at the areas determined by the word Nos. for the synonyms and/or the word Nos. for the antonyms which have been read by the word No. reading means. Then, the index words thus read are displayed on the LCD 2.

As to the CPU 11 having the arrangement above-mentioned, the following description will discuss, with reference to a flow chart in FIG. 11, the operations executed in the CPU 11 adapted to display a word corresponding to index word spelling characters word entered from the index word input keys 20.

First, when the English-English dictionary key 4a or the power-ON key 7 is operated, the English-English dictionary mode is set. For example, as shown in FIG. 12(a), the initial screen requiring the entry of the spelling characters of an index word is displayed on the LCD 2 (S1). There is then received the entry of the index word spelling characters by the alphabet key group 5 and the numerical value input key group 6. Then, the entered spelling characters are displayed on the LCD 2 (S2). For example, when characters "up" are entered from the alphabet key group 5, data are displayed as shown in FIG. 12(b).

Provision may be made such that there is received, at the step S2, not only the entry of the spelling characters of an index word, but also operation for instructing the display of words stored before and after the currently displayed word.

When the operation of the index word searching key 9a is received (S3) and the index word searching key 9a is operated, the word having spelling characters identical with those entered from the alphabet key group 5 is searched in the index word spelling characters stored in the spelling character memory unit 14a' of the ROM 14, and the word No. of the index word corresponding to the spelling characters is obtained based on storing order of the spelling characters (S4).

When the word No. is obtained, there are read the bank Nos. and addresses of the areas containing the dictionary data in the dictionary data memory unit 14c', stored at the addresses obtained by calculation made based on the word No. above-mentioned, in the index memory unit 14b' (S5). Then, there are read the index word, the word Nos. of the synonyms of the index word, and the word Nos. of the antonyms of the index word, stored in the areas designated by the bank Nos. and addresses above-mentioned, in the dictionary data memory unit 14c' (S6).

The index word thus read is coded-data. Accordingly, the coded data are developed in display pattern (S7), and displayed on the LCD 2 (S8).

When the word Nos. for the synonyms or the word Nos. for the antonyms are not equal to zero, i.e., when there exist the synonyms or antonyms, a mark "&" is displayed together with the index word. For example, when the characters "up" have been entered as mentioned earlier, the index word "up" and the mark "&" are displayed as shown in FIG. 12(c). This indicates that the index word "up" has synonyms or antonyms.

Then, when the operation of the synonym & antonym key 9b is received (S9) and the synonym & antonym key 9b is operated, it is judged whether or not the mark "&" is being displayed on the LCD 2, i.e., whether or not the synonyms or antonyms are present (S10). When it is judged that neither synonyms nor antonyms are present, the processing is finished as it is.

On the other hand, when it is judged at S10 that the synonyms or antonyms are present, the sequence proceeds to S11, where there are read again, from the dictionary data memory unit 14c', the word Nos. for the synonyms and the word Nos. for the antonyms. Provision may be made such that there are used the word Nos. for the synonyms and the word Nos. for the antonyms held as read at S6.

Likewise in the steps S5 to S8 above-mentioned, there are read, from the index memory unit 14b' (S12), the bank Nos. and addresses based on the respective word Nos. for the synonyms and antonyms, and then read the index words from the areas in the dictionary data memory unit 14c' designated by these bank Nos. and addresses (S13), and these index words are developed in display pattern (S14) and displayed as the synonyms and antonyms on the LCD 2 (S15).

For example, when the characters "up" have been entered from the alphabet key group 5 as above-mentioned, there are displayed (i) a mark "<antonym>" representing that the displayed word has an antonym, and (ii) the index word "down", as shown in FIG. 12(d).

For example, when there are stored 65,535 index words, the size of the memory area required for containing word Nos. as dictionary data representing synonyms or antonyms, is as small as 2 bytes for every synonym or antonym. Thus, the memory capacity may be considerably reduced as compared with the size of the memory area according to the lengths of the strings of synonyms or antonyms, required for the arrangement where the synonym data or antonym data themselves are stored.

In the arrangement that the bank Nos. and addresses of areas containing index words serving as synonyms or antonyms are stored, there is required a memory area of about one byte for the bank Nos. and about two bytes for the addresses. Thus, the memory capacity required in the embodiment above-mentioned is still smaller than that required in the arrangement above-mentioned.

Further, when displaying synonyms or antonyms, it is not required to newly compare strings or execute a search processing or the like. Thus, the processing speed may not be decreased.

The following description will discuss, with reference to FIGS. 14 to 16, an embodiment of the electronic-type dictionary apparatus adapted to display, with respect to an entered index word, the translated terms, the parts of speech, the idiomatic phrases and the phonetic symbols. For convenience sake, like parts or parts having like functions as those used in the description above-mentioned are designated by like numerals used therein. The detailed description of such like parts or parts having like functions is here omitted.

The LCD 2 is adapted to display data contents such as messages, calculation results, an index word, parts of speech, translated terms, idiomatic phrases, phonetic symbols and the like.

There is disposed a dedicated English-English dictionary key group 9 having an index word searching key 9a for instructing the display the parts of speech and the translated terms of an entered index word, an idiomatic phrase key 9c for instructing the display of the idiomatic phrases relevant to the entered index word, and a phonetic symbol key 9d for instructing the display of the phonetic symbols of the entered index word (See FIG. 14).

The ROM 14 is a read-only memory containing an operation program for displaying translated terms and the like, in particular an input/output control program, and a variety of data such as dictionary data. Each of the dictionary data stored in the ROM 14 has the arrangement as shown in Table 1 for the dictionary data corresponding to, for example, an index word "diffuse".

TABLE 1

| Top Address Containing Data | Contents of Stored Data | Example of Data Contents |
|---|---|---|
| $n_1$ address | Index word string | [diffuse] |
| $n_2$ address | Part-of-speech code data 1 | Verb code |
| $n_3$ address | Translated term string 1 | [To spread abroad] |
| $n_4$ address | Part-of-speech code data 2 | Adjective code |
| $n_5$ address | Translated term string 2 | [Widely spread out] |
| $n_6$ address | Phonetic symbol data 1 | Phonetic symbol code/ [difjû:z]/ Translated term No. code 1 |
| $n_7$ address | Phonetic symbol data 2 | Phonetic symbol code/ [difjû:s]/ Translated term No. code 2 |

More specifically, the dictionary data above-mentioned are stored, in the form of numerical values, in the ROM 14. For examples, the phonetic symbol data in Table 1 are stored in the form of numerical values as shown in Table 2.

TABLE 2

| Address Containing Data | Stored Numerical Value (Hexadecimal) | Contents Represented by Numerical Value |
|---|---|---|
| $n_6$ address | F1 | Phonetic symbol code |
| $n_6 + 1$ address | 64 | Code of phonetic symbol [d] |
| $n_6 + 2$ address | 69 | Code of phonetic symbol [i] |
| $n_6 + 3$ address | 66 | Code of phonetic symbol [f] |
| $n_6 + 4$ address | 6A | Code of phonetic symbol [j] |

TABLE 2-continued

| Address Containing Data | Stored Numerical Value (Hexadecimal) | Contents Represented by Numerical Value |
|---|---|---|
| $n_6 + 5$ address | F5 | Code of phonetic symbol [û] |
| $n_6 + 6$ address | 21 | Code of phonetic symbol [:] |
| $n_6 + 7$ address | 7A | Code of phonetic symbol [z] |
| $n_6 + 8$ address | E0 | Translated term No. display code |
| $n_6 + 9$ address | 01 | Translated term No. |
| $n_7$ address | F1 | Code of phonetic symbol |
| $n_7 + 1$ address | 64 | Code of phonetic symbol [d] |
| $n_7 + 2$ address | 69 | Code of phonetic symbol [i] |
| $n_7 + 3$ address | 66 | Code of phonetic symbol [f] |
| $n_7 + 4$ address | 6A | Code of phonetic symbol [j] |
| $n_7 + 5$ address | F5 | Code of phonetic symbol [û] |
| $n_7 + 6$ address | 21 | Code of phonetic symbol [:] |
| $n_7 + 7$ address | 73 | Code of phonetic symbol [s] |
| $n_7 + 8$ address | E0 | Translated term No. display code |
| $n_7 + 9$ address | 02 | Translated term No. |

For example, when the index word searching key 9a is operated after the index word input keys 20 have been operated in the English-English dictionary mode, there are displayed, with respect to an entered index word, the parts of speech and the translated terms on the LCD 2. When the phonetic symbol key 9d is then operated, there are continuously displayed a plurality of phonetic symbols, if any, of the index word on the LCD 2. Further, when the displayed phonetic symbols are related to specific parts of speech and/or specific translated terms out of all the parts of speech and/or translated terms of the index word, such specific parts of speech and/or translated terms are also displayed.

As to the arrangement above-mentioned, the following description will discuss, with reference to flow charts in FIGS. 13 & 15 and FIG. 16, the operations for displaying the translated terms and the phonetic symbols of an English word, for example, "diffuse", and the operations executed in the CPU 11 for displaying the phonetic symbols.

First, the English-English dictionary key 4a is operated to set the English-English dictionary mode, as shown in FIG. 15 (S1). A message requiring the entry of spelling characters of an index word is displayed on the LCD 2, as shown in FIG. 16(a). Then, an index word string "diffuse" is entered by operating the index word input keys 20 (S2). At this time, the LCD 2 displays the string as entered, as shown in FIG. 6(b).

When the index word searching key 9a is operated (S3), a search is made in index word strings stored in the ROM 14. It is then detected that a string identical with the entered index word string "diffuse" is being stored on and after the address $n_1$, as shown in Table 1. Based on the data stored on the addresses $n_2$ to $n_5$, there are displayed, as shown in FIG. 16(c), (i) a mark "<Verb>" representing that the English word "diffuse" is used as a verb, (ii) the translated term "To spread abroad" at the time the word "diffuse" is used as a verb, (iii) a mark "<Adjective>" representing that the English word "diffuse" is also used as an adjective, and (iv) the translated term "Widely spread out" at the time the word "diffuse" is used as an adjective.

In this state, when, for example, the phonetic symbol key 9d is operated (S4), the CPU 11 executes operations as shown in FIG. 13 to display phonetic symbols.

At steps from S11 to S13, an end code or an phonetic symbol code is searched in the data on and after the address $n_6$ in the ROM 14. That is, the data on and after the address $n_6$ are read in bytes one by one (S11). Then, it is judged whether or not the data thus read are the end code, for example, a predetermined English character or numerical value, or other code than the phonetic symbol code (S12). When the read data are the end code, the display of phonetic symbols is finished.

When the read data are not the end code, the sequence proceeds to the step S13 where it is judged whether or not the read data are a numerical value F1 (represented by the hexadecimal notation, which will also be applied to the following description) representing a phonetic symbol code, i.e., whether or not the data stored on and after the address of which data have been read in the ROM 14, are phonetic symbol data.

When the data read at the step S13 are not a phonetic symbol code, the sequence is returned to the step S11 where the data stored on the next address are read by one byte. Thereafter, the operations of S11 to S13 are repeated until the end code or a phonetic symbol code is read. In this example, the numerical value F1 representing a phonetic symbol code is stored at the address $n_6$. Accordingly, when the data are read, the sequence proceeds to a step S14 where a bracket ([) is displayed as shown in FIG. 16(d).

Then, there are read data by one byte stored at the address $n_6+1$ in the ROM 14 (S15), and it is judged whether or not the read data are a translated term No. display code, i.e., whether or not the read data are equal to a numerical value E0 (S16). In this example, the data on the address $n_6+1$ is the character code of the phonetic symbol "d", i.e., a numerical value 64. Since the numerical value 64 is not equal to E0, the sequence proceeds to a step S17. At the step S17, the phonetic symbol "d" having the numerical value 64 as a character code, is displayed on the LCD 2 and the sequence is returned to the step S15.

Thereafter, the similar operations are repeated at the steps S15 to S17 and the phonetic symbols "ifjû:z" are displayed after the phonetic symbol "d". When the numerical value stored at the address $n_6+8$ is read in at the step S15, it is judged that this numerical value is equal to E0 at the step S16. Then, the sequence proceeds to a step S18. In other words, since the data represented by this numerical value E0 is a translated term No. display code, there will be executed a processing for displaying the translated term "To spread abroad" relating to the phonetic symbols "difjû:z", based on the numerical value stored at the next address $n_6+9$.

A bracket (]) is first displayed at the step S18 and a numerical value 01 stored at the address $n_6+9$ is then read in (S19). This numerical value 01 indicates that the phonetic symbols "difjû:z" displayed based on the data stored at the addresses $n_6+1$ to $n_6+7$ are those to be used at the time when the index word "diffuse" is used, as a verb, as having the meaning "To spread abroad" stored as the translated term string 1. Then, the translated term string 1 stored at the addresses $n_3$ to $n_4-1$ is read in (S20), and the read-in translated term string 1, i.e., "To spread abroad", is displayed (S21). The sequence is then returned to the step S11.

Thereafter, the operations of S11 to S21 are repeated in the same manner. This time, there are displayed, on the LCD 2, the phonetic symbols "difjû:s" and the translated term "Widely spread out".

Thus, it may be readily understood that, based on the display as shown in FIG. 16(d), the English word "diffuse" may be pronounced in the two ways, i.e., "difjû:z" and "difjû:s", and the word "diffuse" is pronounced in the former way when it is used as a verb having the meaning "To spread abroad", and in the latter way when it is used as an adjective having the meaning "Widely spread out".

In this arrangement, only one-byte numerical value 01 or 02 as the translated term No. is stored at the addresses $n_6+9$ and $n_7+9$ and, when displaying them, the translated term string 1 and translated term string 2 are referred to. Accordingly, the increase in data amount may be minimized.

When all the phonetic symbols and translated terms of the index word are displayed, it is then judged that the next data to be read in at the step S11 are the end code representing the end of phonetic symbol data, i.e., a predetermined English character or numerical value, or other code than a phonetic symbol code (S12). Then, the sequence does not proceed to the step S13 and the phonetic symbol display operation is finished.

Since the phonetic symbols of an index word are continuously displayed regardless of the relevant translated terms or parts of speech, all the phonetic symbols may be readily learned. Further, it may be readily learned how the respective phonetic symbols are related to the respective parts of speech or translated terms.

In the embodiment above-mentioned, the description has been made of the application where the translated terms are displayed together with the phonetic symbols. Alternatively, the parts of speech of an index word may be displayed, or the translated terms and the parts of speech may be simultaneously displayed.

The following description will discuss, with reference to FIGS. 17 to 19, the electronic-type dictionary apparatus so arranged as to display the meanings, translated terms and the like with respect to an entered index word. For convenience sake, like parts or parts having like functions as those used in the description above-mentioned are designated by like numerals used therein. The detailed description of such like parts or parts having like functions is here omitted.

As shown in FIG. 19, the input key group 3b on the left-hand portion 1a has an operation key group 9 including: an index word searching key 9a for designating the display of the index word corresponding to entered spelling characters, and the meanings and translated terms thereof; a learning mode setting key 9e for setting the operation mode to a learning mode; a learning key 9f adapted to be pressed, in the learning mode, for displaying the index word after the spelling characters have been entered and the index word searching key 9a has been pressed; and the like.

The ROM 14 previously contains an operation program for displaying the meanings and translated terms of index words, in particular an input/output control program, and a variety of data such as English-English dictionary data. More specifically, in the English-English dictionary data, there are stored index words corresponding to entered spelling characters, the meanings and/or translated terms of the index words as respectively classified.

Control means is mainly constituted by the CPU 11, the ROM 14 and RAM 15. The control means is arranged such that, when spelling characters are entered in the learning mode and the index word searching key 9a is operated, the index word corresponding to the entered spelling characters is not displayed, but the meanings and/or translated terms of the index word are displayed, and only when the learning key 9f is pressed as a predetermined operation, the index word is displayed.

According to the arrangement above-mentioned, for example when the power-ON key 7 is pressed to cause the apparatus to be operable (S1) as shown in FIG. 17, the initial screen is displayed on the LCD 2 (S2). As shown in FIG. 18(a), a message "Spelling characters ?" is displayed on the LCD 2. Provision is made such that, when the power-ON key 7 is pressed, the English-English dictionary mode is automatically set.

When the learning mode setting key 9e is pressed to change the mode from the English-English dictionary mode to the learning mode (S3), a message "Meanings ?" is displayed on the LCD 2 as shown in FIG. 18(b). Provision may be made such that there is displayed, on the LCD 2, a symbol representing that the apparatus is being set to the learning mode. With such provision, this symbol may be displayed at the step S3 so that the operator is aware of the fact that the apparatus is in the learning mode. Then, when spelling characters, for example "aikidou", are entered by operating the alphabet key group 5 (S4) and the index word searching key 9a is pressed (S5), the sequence proceeds to the next step S6 where it is judged whether or not the operation mode is the learning mode (S6). In this example, since the learning mode has been set at the step S3, the judgment YES is made and the sequence proceeds to a step S7 where only the meanings and/or translated terms of the index word, i.e., "aikidou", are searched, independently from the index word (S7). When such search is complete, the data are developed and displayed based on the searched English-English dictionary data (S8). As shown in FIG. 18(c), the LCD 2 displays, as the meanings of "aikidou", a message "◇ the art of self-defence for immobilizing a violent force exerted from another person with the use thereof" (S9). Then, it is judged whether or not the learning key 9c has been pressed (S10). In the affirmative, the sequence proceeds to a step of index word search processing (S11). Upon completion of such search processing, the data are developed and displayed based on the searched English-English dictionary data (S12). As shown in FIG. 18(d), the LCD 2 displays the messages "Aikidou ◇ Art of self-defence for immobilizing a violent force exerted" (S13). In this example, the index word and the meanings thereof are simultaneously displayed. However, provision may be made such that only the index word is displayed. Further, when it is desired to display the message on and after "exerted", predetermined keys may be operated to scroll the display screen.

At the step 10, when it is judged that other key than the learning key 9f has been pressed, the sequence proceeds to other processing according to the other key which has been pressed.

At the step 6, when it is judged that the operation mode is other mode, for example the English-English dictionary mode, than the learning mode, a so-called normal display is to be made. Thus, the sequence proceeds to a step for searching the index word and the meanings and/or translated terms thereof (S14). Upon completion of such search processing, the data are developed and displayed based on the searched English-English dictionary data (S15). At this time too, the LCD 2 displays the messages "Aikidou    Art of self-defence for immobilizing a violent force exerted", as shown in FIG. 18(d) (S16).

As thus described, in the learning mode, when spelling characters are entered and the index word searching key 9a is operated, there is not displayed the index word corresponding to the entered spelling characters, but displayed the meanings and/or translated terms of the index word. Thus, the apparatus may be used for learning of index words corresponding to the displayed meanings and/or translated terms. Further, even in the learning mode, when the learning key 9f is operated, an index word may be displayed together with the meanings and/or translated terms of the index word, or only the index word may be displayed. Thus, the operator may make sure of or memorize the index word in a treacherous memory or which he does not remember.

On the other hand, in other mode than the learning mode, for example the English-English dictionary mode, when spelling characters are entered and the searching key 9c is operated, there may be simultaneously displayed the index word corresponding to the entered spelling characters, and the meanings and/or translated terms of the index word. Thus, the index word and the meanings or translated terms thereof may be readily and quickly checked. In the apparatus also having such a function, the operation for achieving, for example, the English-English dictionary function, does not become complicate. Further, the apparatus requires neither considerable increase in the capacity of the dictionary data memory means, nor considerable modification of the data arrangement.

As described in the foregoing, the information searching apparatus in accordance with the present invention comprises:

information memory means having a plurality of banks for storing a plurality of types of information data to be searched, a predetermined number of types of information data to be searched being grouped in one block;

secondary table memory means containing, for every information data to be searched, (i) the number of changed banks which is the difference between (a) the base bank No., i.e., the top bank No. of the area containing the first information data to be searched of a block containing information data to be searched and (b) the top bank No. of the area containing the information data to be searched, and (ii) the real address of the information to be searched which is the top address of the area containing the information data to be searched;

primary table memory means containing, for every block, (i) the top bank No. of the area containing the number of changed banks and the real address of the first information data to be searched of each block in the secondary table memory means, (ii) secondary table bank Nos. serving as addresses, (iii) secondary table addresses and (iv) the base bank No. of each block;

primary table reading means for reading, from the primary table memory means, (i) the base bank No. of a block containing information data to be searched, (ii) the secondary table bank No. and (iii) the secondary table address, based on the block No. representing the block containing information data to be searched, secondary table reading means for reading, from the secondary table memory means, the number of changed banks for information data to be searched and the real address of the information to be searched, based on (i) the in-block information number representing where the real address of the information data to be searched is stored in the block in the secondary table memory means, (ii) the secondary table bank No. and (iii) the secondary table address; and information data reading means for reading, from the information memory means, the information data to be searched, based on the base bank number, the number of changed banks and the real address of the information to be searched.

According to the apparatus having the arrangement above-mentioned, even though one block extends over two or more banks, the bank Nos. of the respective information data to be searched may be readily obtained. Therefore, the information data to be searched having different lengths, may be stored and searched without any complication of the control of the bank Nos. or the like. Further, the memory area for storing the bank Nos. and the like may be small. Accordingly, even though a large quantity of information is to be stored and searched, no considerable increase in memory capacity is required. Therefore, a large quantity of information data to be searched having different lengths may be readily stored and searched.

The information searching apparatus in accordance with another embodiment of the present invention comprises:

display means for displaying an index word, parts of speech, translated terms, phonetic symbols and the like;

index word input means for entering an index word;

index word searching means for designating the display of the parts of speech and the translated terms of an entered index word;

- phonetic symbol designating means for designating the display of the phonetic symbols of the entered index word; and control means for displaying the parts of speech and translated terms of the entered index word when the index word searching means is operated after the index word input means has been operated, and for continuously displaying a plurality of phonetic symbols, if any, of the index word when the phonetic symbol designating means is operated, and for displaying, when the displayed phonetic symbols relate to specific parts of speech and/or specific translated terms of the index word out of the parts of speech and/or translated terms thereof, such specific parts of speech and/or specific translated terms, together with the phonetic symbols.

With the use of the apparatus having the arrangement above-mentioned, the user may readily and quickly learn all the phonetic symbols of the index word regardless of the relevant parts of speech or translated terms. Further, the user may readily and quickly learn and make sure of the parts of speech or translated terms to which the respective phonetic symbols are related. Further, according to the apparatus, the operations are neither multi-staged nor complicated, thus preventing the maneuverability from being lowered.

The information searching apparatus in accordance with a further embodiment of the present invention comprises:

display means for displaying the spelling characters, synonyms and antonyms of an index word;

index word input means for entering the index word spelling characters;

index word searching means for searching the index word;

synonym and antonym searching means for searching the synonyms and antonyms of the index word;

whereby the index word corresponding to entered spelling characters is displayed when the index word searching means is operated after the index word input means has been operated to enter the index word spelling characters, and the synonyms and/or antonyms of the index word are displayed when the synonym and antonym searching means is operated;

dictionary data memory means containing, as a series of dictionary data for every index word, an index word, the word Nos. of the synonyms of the index word, and/or the word Nos. of the antonyms of the index word, in an area determined by the word No. set for the index word;

word No. reading means for reading the word Nos. for the synonyms and/or the word Nos. for the antonyms, stored in the dictionary data memory means; and index word reading & display means for reading and displaying, on the display means, the index words stored in the areas determined by the word Nos. for the synonyms and/or the word Nos. for the antonyms in the dictionary data memory means when the synonym and antonym searching means is operated, these word Nos. being read by the word No. reading means.

According to the apparatus having the arrangement above-mentioned, there may be stored only the word Nos. as the dictionary data representing the synonyms and/or antonyms in the dictionary data memory means. Accordingly, the memory capacity required for the dictionary data memory means in its entirety may be minimized, regardless of the lengths of the strings of the synonyms and/or antonyms.

The information searching apparatus in accordance with still another embodiment of the present invention comprises:

display means for displaying the index word corresponding to entered spelling characters, the meanings and/or translated terms of the index word;

dictionary data memory means containing, in a separated manner, index word, and the meanings and/or translated terms of the index words;

index word input means for entering the index word spelling characters;

learning mode setting means for switching the operation mode to a learning mode; and control means for displaying, on the display means, the meanings and/or translated terms of the index word corresponding to spelling characters without display of the index word when, in the learning mode, the spelling characters are entered and the index word searching means is operated, and for displaying the index word only when a predetermined operation is made.

With the use of the apparatus having the arrangement above-mentioned, the user may check whether or not he has memorized the index word. For the index word in a treacherous memory or which the user does not remember, he may make sure of or memorize it immediately. On the other hand, in the dictionary mode, the user may readily and quickly check the index word and the meanings or translated terms thereof. This readily enhances the learning effect. In the apparatus also having such a function, the operation for achieving, for example, the English-English dictionary function, does not become complicate. Further, the apparatus requires neither considerable increase in the capacity of the dictionary data memory means, nor considerable modification of the data arrangement.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An information searching apparatus, comprising:
   an information memory means for storing a plurality of types of information to be searched, the information memory means having a plurality of banks, each bank serving as a memory unit;
   a secondary table memory means for storing a plurality of numbers of changed banks, and a real address for each information to be searched, each number of changed banks being a difference between (a) a base bank No. indicating a top bank No. of an area containing a first information to be searched of a block wherein information to be searched is contained and (b) each top bank No. of an area where respective information to be searched other than the first information to be searched are stored, each real address indicating a top address of the area wherein each information to be searched is stored, with each block having a predetermined number of types of information to be searched;
   a primary table memory means for storing a secondary table bank No., a secondary table address, and the base bank No. for each block, the secondary table bank No. and the secondary table address indicating a top bank No. and a real address respectively of an area wherein a first number of changed banks of each block and real address of each block are stored in said secondary table memory means;
   a primary table reading means for reading from the primary table memory means (a) the base bank No. of the block wherein the information to be searched is contained, (b) the secondary table bank No., and (c) the secondary table address according to a block No. indicating the block wherein the information to be searched is contained;
   a secondary table reading means for reading the number of changed banks and the real address from the secondary table memory means according to (a) the secondary table bank No., (b) the secondary table address, and (c) an in-block information number indicating where the real address of said information to be searched is stored in the block to which the information to be searched belongs; and
   an information reading means for reading from the information memory means the information to be searched according to the base bank No., the number of changed banks and the real address, the base bank No. being added to the number of changed banks.

2. An information searching apparatus as set forth in claim 1, further comprising a liquid crystal display device having a dot matrix arrangement for displaying searched information or the like.

3. An information searching apparatus as set forth in claim 1, further comprising mode setting means formed by a key group in a matrix arrangement, a click such as a mouse, wherein there may be selectively set a variety of modes such as an English-English dictionary mode, a calender mode, a schedule mode, a calculation mode, a telephone number mode, a memo mode.

4. An information searching apparatus as set forth in claim 1, further comprising:
   a CPU serving as a central processing unit for processing operations of said apparatus in an entirety thereof;
   an I/O port through which data are entered in and supplied from said apparatus;
   a ROM serving as a read-only memory containing an operation program of said apparatus,
   a RAM serving as a read/write random-access memory for storing data entered from an index word input means and for temporarily writing data while said CPU is under operation; and
   a real time clock serving as a circuit for counting, in real time, current date and time.

5. An information searching apparatus as set forth in claim 4, wherein the ROM has an arrangement including a primary table memory unit, a secondary table memory unit and a meaning data memory unit.

6. An information searching apparatus as set forth in claim 4, wherein the CPU has an arrangement including primary table reading means, secondary table reading means and means for reading information to be searched.

7. An information searching apparatus as set forth in claim 1, wherein the information memory means has an arrangement including a meaning data memory unit for storing meaning data corresponding to spelling characters of index words.

8. An information searching apparatus comprising:
   display means for displaying spelling characters, synonyms and antonyms of an index word;
   index word input means for entering the index word spelling characters;
   index word searching means for searching the index word;
   synonym and antonym searching means for searching synonyms and antonyms of the index word;
   whereby the index word corresponding to entered spelling characters is displayed when said index word searching means is operated after said index word input means has been operated to enter the index word spelling characters, and the synonyms and/or antonyms of the index word are displayed when said synonym and antonym searching means is operated;
   dictionary data memory means containing, as a series of dictionary data for every index word, an index word, word Nos. of the synonyms of the index word, and/or word Nos. of the antonyms of the index word, in an area determined by a word No. set for the index word;
   word No. reading means for reading the word Nos. for the synonyms and/or the word Nos. for the antonyms, stored in said dictionary data memory means; and
   index word reading & display means for reading and displaying, on said display means, the index words stored in the areas determined by the word Nos. for the synonyms and/or the word Nos. for the antonyms in said dictionary data memory means when said synonym and antonym searching means is operated, said word Nos. being read by said word No. reading means.

9. An information searching apparatus as set forth in claim 8, wherein the display means is a liquid crystal display device having a dot matrix arrangement.

10. An information searching apparatus as set forth in claim 8, wherein the index word input means includes a key group having a matrix arrangement, and a click such as a mouse.

11. An information searching apparatus as set forth in claim 8, further comprising:
   a CPU serving as a central processing unit for processing operations of said apparatus in the entirety thereof;
   an I/O port through which data are entered in and supplied from said apparatus;
   a ROM serving as a read-only memory containing an operation program of said apparatus.
   a RAM serving as a read/write random-access memory for storing data entered from the index word input means and for temporarily writing data while said CPU is under operation; and
   a real time clock serving as a circuit for counting, in real time, current date and time.

12. An information searching apparatus as set forth in claim 11, wherein the ROM comprises:
   a memory unit containing spelling characters in order of word Nos. respectively set for index words;
   a dictionary data memory unit serving as dictionary data memory means containing, as a series of dictionary data, additional information of each index word such as word Nos. for the synonyms, word Nos. for the antonyms, parts of speech, said additional information being stored for every index word; and
   an index memory unit containing bank Nos. and addresses of areas containing said dictionary data in said dictionary data memory unit, at addresses obtained by calculations made based on said word Nos.

13. An information searching apparatus as set forth in claim 12, wherein the dictionary data memory unit containing, instead of the word Nos., binary signals representing a presence and absence of the synonyms and antonyms of index words.

14. An information searching apparatus as set forth in claim 13, wherein the additional information has flags representing the presence and absence of the synonyms and antonyms of index words, and the word No. memory areas are not disposed for index words having neither synonyms nor antonyms.

15. An information searching apparatus as set forth in claim 12, wherein the index memory unit contains the data in order of the word Nos. respectively set for the index words.

16. An information searching apparatus as set forth in claim 12, wherein the index memory unit contains the word Nos. in contrast with the spelling characters of index words.

17. An information searching apparatus comprising:
   display means for displaying an index word, parts of speech, translated terms, phonetic symbols;
   index word input means for entering an index word;
   index word searching means for designating the display of parts of speech and translated terms of an entered index word;
   phonetic symbol designating means for designating the display of phonetic symbols of the entered index word; and
   control means for displaying the parts of speech and translated terms of the entered index word when said index word searching means is operated after said index word input means has been operated, and for continuously displaying a plurality of phonetic symbols, if any, of the index word when said phonetic symbol designating means is operated, and for displaying, when the displayed phonetic symbols relate to specific parts of speech and/or specific translated terms of the index word out of the parts of speech and/or translated terms thereof, said specific parts of speech and/or specific translated terms together with the phonetic symbols.

18. An information searching apparatus as set forth in claim 17, wherein the control means comprises:
   a CPU serving as a central processing unit for processing operations of said apparatus in an entirety thereof;
   an I/O port through which data are entered in and supplied from said apparatus;
   a ROM serving as a read-only memory containing an operation program of said apparatus, a variety of data such as an input/output control program, or dictionary data;
   a RAM serving as a read/write random-access memory for storing data entered from said index word input means and for temporarily writing data while said CPU is under operation; and
   a real time clock serving as a circuit for counting, in real time, current date and time.

19. An information searching apparatus as set forth in claim 17, wherein the display means has an arrangement including a liquid crystal display device in a dot matrix arrangement.

20. An information searching apparatus as set forth in claim 17, further comprising a mode setting key group for selectively calling and setting a variety of modes such as an English-English dictionary mode, a calender mode, a schedule mode, a calculation mode, a telephone number mode, or a memo mode.

21. An information searching apparatus as set forth in claim 17, wherein the index word searching means and the phonetic symbol designating means are formed by a key group in a matrix arrangement, a click such as a mouse.

22. An information searching apparatus comprising:
   display means for displaying an index word corresponding to entered spelling characters, meanings and/or translated terms of the index word;
   dictionary data memory means containing, in a separated manner, the index word corresponding to entered spelling characters, and the meanings and/or translated terms of said index word;
   index word input means for entering the index word spelling characters;
   learning mode setting means for switching an operation mode to a learning mode; and
   control means for displaying, on said display means, the meanings and/or translated terms of the index word corresponding to spelling characters without display of said index word when, in said learning mode, the spelling characters are entered and said index word searching means is operated, and for displaying the index word only when a predetermined operation is made.

23. An information searching apparatus as set forth in claim 22, wherein the control means comprises:
   a CPU serving as a central processing unit for processing operations of said apparatus in an entirety thereof;
   an I/O port through which data are entered in and supplied from said apparatus;
   a ROM serving as a read-only memory containing an operation program of said apparatus and a variety of data such as an input/output control program, dictionary data;

a RAM serving as a read/write random-access memory for storing data entered from said index word input means and for temporarily writing data while said CPU is under operation; and a real time clock serving as a circuit for counting, in real time, current date and time.

24. An information searching apparatus as set forth in claim 22, wherein the display means has an arrangement including a liquid crystal display device in a dot matrix arrangement.

25. An information searching apparatus as set forth in claim 22, further comprising a mode setting key group for selectively calling and setting a variety of modes such as an English-English dictionary mode, a calender mode, a schedule mode, a calculation mode, a telephone number mode, or a memo mode.

26. An information searching apparatus as set forth in claim 22, wherein the index word input means and the learning mode setting means are formed by a key group in a matrix arrangement, a click such as a mouse.

* * * * *